(12) United States Patent
Miyasaka et al.

(10) Patent No.: US 11,598,972 B2
(45) Date of Patent: Mar. 7, 2023

(54) DIFFRACTIVE OPTICAL ELEMENT, PROJECTION DEVICE AND MEASURING DEVICE

(71) Applicant: AGC Inc., Chiyoda-ku (JP)

(72) Inventors: Koji Miyasaka, Chiyoda-ku (JP); Ryota Murakami, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 645 days.

(21) Appl. No.: 16/672,669

(22) Filed: Nov. 4, 2019

(65) Prior Publication Data

US 2020/0110277 A1    Apr. 9, 2020

Related U.S. Application Data

(63) Continuation of application No. PCT/JP2018/018973, filed on May 16, 2018.

(30) Foreign Application Priority Data

May 26, 2017    (JP) .............................. JP2017-104668

(51) Int. Cl.
*G02B 27/42* (2006.01)
*G11B 7/1353* (2012.01)
*G11B 7/09* (2006.01)

(52) U.S. Cl.
CPC .............. *G02B 27/42* (2013.01); *G11B 7/1353* (2013.01); *G11B 7/0903* (2013.01); *G11B 7/0909* (2013.01)

(58) Field of Classification Search
CPC ........ G02B 27/42; G02B 5/18; G11B 7/1353; G11B 7/0903; G11B 7/0909; G01B 11/25; G03B 21/14
See application file for complete search history.

(56) References Cited

U.S. PATENT DOCUMENTS

| 6,075,627 A | 6/2000 | Feldman et al. |
| 2011/0141873 A1 | 6/2011 | Miyasaka et al. |

(Continued)

FOREIGN PATENT DOCUMENTS

| JP | 2004-258442 A | 9/2004 |
| JP | 2006-259132 A | 9/2006 |

(Continued)

OTHER PUBLICATIONS

International Search Report dated Aug. 7, 2018 in PCT/JP2018/018973 filed on May 16, 2018.

*Primary Examiner* — Robert E. Tallman
(74) *Attorney, Agent, or Firm* — Oblon, McClelland, Maier & Neustadt, L.L.P.

(57) ABSTRACT

To provide a diffractive optical element having a high light utilization efficiency, whereby light spots having a predetermined pattern can be stably formed, a projection device and a measuring device.
The diffractive optical element of the present invention comprises a transparent substrate, a convexo-concave portion formed so as to be in contact with one surface of the transparent substrate and a filling portion with which concave portions of the convexo-concave portions are filled and which covers top surfaces of convex portions of the convexo-concave portion for planarizing the convexo-concave portion, wherein the convexo-concave portion has at least two stages on the surface of the transparent substrate; the top surfaces of the respective stages are parallel to one another; among the transparent substrate, the convexo-concave portion and the filling portion, the refractive indexes of at least the convexo-concave portion and the filling portion are different with respect to the incident light which enters from the normal direction of the surface of the transparent substrate; and the refractive indexes of the transparent substrate, (Continued)

the convexo-concave portion and the filling portion with respect to incident light are at most 2.2.

19 Claims, 18 Drawing Sheets

(56) References Cited

U.S. PATENT DOCUMENTS

| 2012/0287767 | A1 | 11/2012 | Miyasaka et al. | |
|---|---|---|---|---|
| 2013/0182327 | A1* | 7/2013 | Miyasaka | G01B 11/25 |
| | | | | 359/566 |
| 2013/0277703 | A1 | 10/2013 | Matsuzaki | |

FOREIGN PATENT DOCUMENTS

| JP | 5174684 B2 | 4/2013 |
|---|---|---|
| JP | 5760391 B2 | 8/2015 |
| WO | 2004/097816 A1 | 11/2004 |
| WO | WO 2010/016559 A1 | 2/2010 |
| WO | WO 2012/018017 A1 | 2/2012 |
| WO | WO 2013/084442 A1 | 6/2013 |
| WO | WO 2013/168740 A1 | 11/2013 |

* cited by examiner

| y\x | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| -7 | 0.1% | 0.0% | 0.0% | 0.0% | 0.0% | 0.0% | 0.0% | 0.2% | 0.0% | 0.0% | 0.0% | 0.0% | 0.0% | 0.0% | 0.0% |
| -6 | 0.0% | 0.1% | 0.0% | 0.0% | 0.1% | 0.0% | 0.0% | 0.0% | 0.1% | 0.0% | 0.0% | 0.1% | 0.1% | 0.0% | 0.1% |
| -5 | 0.0% | 0.1% | 0.1% | 0.1% | 0.1% | 0.0% | 0.0% | 0.0% | 0.3% | 0.1% | 0.3% | 0.0% | 0.1% | 0.0% | 0.0% |
| -4 | 0.0% | 0.0% | 0.1% | 0.0% | 0.1% | 0.1% | 0.0% | 0.0% | 0.0% | 0.2% | 0.2% | 0.0% | 0.1% | 0.1% | 0.1% |
| -3 | 0.0% | 0.1% | 0.1% | 0.1% | 0.1% | 0.0% | 0.0% | 0.4% | 0.2% | 0.1% | 0.1% | 0.0% | 0.1% | 0.0% | 0.1% |
| -2 | 0.0% | 0.1% | 0.1% | 0.3% | 0.4% | 0.0% | 3.9% | 4.0% | 4.1% | 0.0% | 0.1% | 0.0% | 0.0% | 0.0% | 0.0% |
| -1 | 0.0% | 0.0% | 0.1% | 0.1% | 0.1% | 4.2% | 4.2% | 4.0% | 4.0% | 4.0% | 0.0% | 0.0% | 0.1% | 0.0% | 0.0% |
| 0 | 0.0% | 0.0% | 0.1% | 0.0% | 0.1% | 4.2% | 4.0% | 4.1% | 4.2% | 4.0% | 0.4% | 0.1% | 0.2% | 0.0% | 0.0% |
| 1 | 0.1% | 0.0% | 0.1% | 0.0% | 0.1% | 4.2% | 4.1% | 4.0% | 4.1% | 4.0% | 0.3% | 0.1% | 0.0% | 0.0% | 0.0% |
| 2 | 0.0% | 0.1% | 0.0% | 0.1% | 0.1% | 0.1% | 4.1% | 3.7% | 4.0% | 0.1% | 0.0% | 0.0% | 0.1% | 0.1% | 0.1% |
| 3 | 0.0% | 0.1% | 0.1% | 0.2% | 0.1% | 0.0% | 0.0% | 0.2% | 0.2% | 0.3% | 0.2% | 0.0% | 0.1% | 0.1% | 0.0% |
| 4 | 0.0% | 0.0% | 0.0% | 0.0% | 0.2% | 0.0% | 0.0% | 0.2% | 0.1% | 0.0% | 0.0% | 0.0% | 0.1% | 0.1% | 0.1% |
| 5 | 0.0% | 0.1% | 0.1% | 0.1% | 0.2% | 0.1% | 0.1% | 0.0% | 0.0% | 0.0% | 0.1% | 0.1% | 0.0% | 0.0% | 0.0% |
| 6 | 0.1% | 0.0% | 0.0% | 0.0% | 0.0% | 0.3% | 0.0% | 0.1% | 0.0% | 0.0% | 0.0% | 0.0% | 0.1% | 0.0% | 0.1% |
| 7 | 0.0% | 0.0% | 0.1% | 0.1% | 0.2% | 0.0% | 0.0% | 0.0% | 0.0% | 0.0% | 0.1% | 0.0% | 0.0% | 0.0% | 0.0% |

Fig. 7A

| y\x | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| -7 | 0.1% | 0.0% | 0.0% | 0.0% | 0.0% | 0.0% | 0.0% | 0.2% | 0.0% | 0.0% | 0.0% | 0.0% | 0.0% | 0.0% | 0.0% |
| -6 | 0.0% | 0.1% | 0.0% | 0.0% | 0.1% | 0.0% | 0.0% | 0.0% | 0.1% | 0.0% | 0.0% | 0.1% | 0.1% | 0.0% | 0.1% |
| -5 | 0.0% | 0.1% | 0.1% | 0.1% | 0.1% | 0.0% | 0.0% | 0.0% | 0.3% | 0.1% | 0.3% | 0.0% | 0.1% | 0.0% | 0.0% |
| -4 | 0.0% | 0.0% | 0.1% | 0.0% | 0.1% | 0.1% | 0.0% | 0.0% | 0.0% | 0.2% | 0.2% | 0.0% | 0.1% | 0.1% | 0.1% |
| -3 | 0.0% | 0.1% | 0.1% | 0.1% | 0.1% | 0.0% | 0.0% | 0.4% | 0.2% | 0.1% | 0.1% | 0.0% | 0.1% | 0.0% | 0.1% |
| -2 | 0.0% | 0.1% | 0.1% | 0.3% | 0.4% | 0.0% | 3.9% | 4.0% | 4.1% | 0.0% | 0.1% | 0.0% | 0.0% | 0.0% | 0.0% |
| -1 | 0.0% | 0.0% | 0.1% | 0.1% | 0.1% | 4.2% | 4.2% | 4.0% | 4.0% | 4.0% | 0.0% | 0.0% | 0.1% | 0.0% | 0.0% |
| 0 | 0.0% | 0.0% | 0.1% | 0.0% | 0.1% | 4.2% | 4.0% | 4.1% | 4.2% | 4.0% | 0.4% | 0.1% | 0.2% | 0.0% | 0.0% |
| 1 | 0.1% | 0.0% | 0.1% | 0.0% | 0.1% | 4.2% | 4.1% | 4.0% | 4.1% | 4.0% | 0.3% | 0.1% | 0.0% | 0.0% | 0.0% |
| 2 | 0.0% | 0.1% | 0.0% | 0.1% | 0.1% | 0.1% | 4.1% | 3.7% | 4.0% | 0.1% | 0.0% | 0.0% | 0.1% | 0.1% | 0.1% |
| 3 | 0.0% | 0.1% | 0.1% | 0.2% | 0.1% | 0.0% | 0.0% | 0.2% | 0.2% | 0.3% | 0.2% | 0.0% | 0.1% | 0.1% | 0.0% |
| 4 | 0.0% | 0.0% | 0.0% | 0.0% | 0.2% | 0.0% | 0.0% | 0.2% | 0.1% | 0.0% | 0.0% | 0.0% | 0.1% | 0.1% | 0.1% |
| 5 | 0.0% | 0.1% | 0.1% | 0.1% | 0.2% | 0.1% | 0.1% | 0.0% | 0.0% | 0.0% | 0.1% | 0.1% | 0.0% | 0.0% | 0.0% |
| 6 | 0.1% | 0.0% | 0.0% | 0.0% | 0.0% | 0.3% | 0.0% | 0.1% | 0.0% | 0.0% | 0.0% | 0.0% | 0.1% | 0.0% | 0.1% |
| 7 | 0.0% | 0.0% | 0.1% | 0.1% | 0.2% | 0.0% | 0.0% | 0.0% | 0.0% | 0.0% | 0.1% | 0.0% | 0.0% | 0.0% | 0.0% |

Fig. 7B

| Medium at outgoing side | Ta$_2$O$_5$ | - |
|---|---|---|
| Refractive index controlling layer | SiO$_2$ | 30 nm |
| | Ta$_2$O$_5$ | 26 nm |
| | SiO$_2$ | 35 nm |
| | Ta$_2$O$_5$ | 21 nm |
| Medium at incident side | Glass substrate | - |

| Medium at outgoing side | Air | - |
|---|---|---|
| Refractive index controlling layer | SiO$_2$ | 180 nm |
| | Ta$_2$O$_5$ | 158 nm |
| | SiO$_2$ | 33 nm |
| | Ta$_2$O$_5$ | 29 nm |
| | SiO$_2$ | 25 nm |
| | Ta$_2$O$_5$ | 23 nm |
| Medium at incident side | Glass substrate | - |

DIFFRACTIVE OPTICAL ELEMENT, PROJECTION DEVICE AND MEASURING DEVICE

TECHNICAL FIELD

The present invention relates to a diffractive optical element to form light spots having a predetermined pattern, a projection device provided with the diffractive optical element and a measuring device.

BACKGROUND ART

A device to measure a position, a shape, etc. of an object to be measured, by applying predetermined light to an object to be measured and detecting light scattered by the object to be measured, is available (for example, Patent Document 1). In such a measuring device, a diffractive optical element may be used to apply light having a specific pattern to an object to be measured. Further, a diffractive diffusion optical element may be used in applications to enhance uniformity of light applied to an object to be projected (for example, Patent Document 2).

A diffractive optical element to form predetermined light spots such as a specific light pattern on a predetermined projection plane or a light pattern to realize uniform irradiation, is designed based on Fourier transformation of phase distribution of outgoing light. Such a diffractive optical element, for example, has a two-dimensional convexo-concave pattern in planar view. Phase distribution is obtained by means of iterative Fourier transformation or the like to appropriately arrange base units having a predetermined convexo-concave pattern to obtain such a diffractive optical element.

For example, a diffractive optical element produced by convexo-concave processing a surface of a substrate is known. In the case of such a convexo-concave structure, light can be diffracted with the desired path difference by utilizing a relatively large difference in the refractive index between air (refractive index=1) to be a material with which the concave portion is filled and a material of the convex portion, whereby the height of the convex portion can be designed to be relatively small. The height of the convex portion may be considered as the depth of the concave portion.

On the other hand, the structure had a disadvantage such that light spots having a predetermined pattern cannot be stably formed due to attachment of stain, water droplets, deposits, etc., since the convexo-concave surface is exposed to outer air. That is, the convexo-concave shape of the exposed convexo-concave surface is changed due to attached substances, and the diffraction efficiency is thereby changed.

As another example of the diffractive optical element, a diffractive optical element having a structure such that a concave portion (specifically, the concave portion and the top surface of a convex portion) is filled with a refractive index material which is different from a material for the convex portion and is not air. In the above structure, the change of the diffraction efficiency due to attached substances can be suppressed, since the convexo-concave surface is not exposed. For example, in Patent Document 3, a diffractive optical element using another transparent material having a different refractive index to fill a convexo-concave pattern which forms two-dimensional light spots, is shown.

PRIOR ART DOCUMENTS

Patent Documents

Patent Document 1: Japanese Patent No. 5174684
Patent Document 2: U.S. Pat. No. 6,075,627
Patent Document 3: Japanese Patent No. 5760391

DISCLOSURE OF INVENTION

Technical Problem

However, in a case where a concave portion is filled with a material other than air, a convex portion is required to be high in order to obtain a predetermined path difference, since the concave portion has a higher refractive index than air, whereby the difference in the refractive index between the concave portion and the convex portion is small. Particularly, in a case of a diffractive optical element to be used in a projection device or a measuring device, which forms light spots having a large diffraction angle for applying light on a large area, the height of the convex portion is high, and processing may be difficult, unless the combination of such materials has a large difference in the refractive index.

Thus, it is considered to overcome the problem that the accuracy of diffraction deteriorates due to difficulty in processing, by a convexo-concave structure in which a material having a high refractive index is used as a material for the convex portion or as a material for the concave portion (filling material), whereby the height of the convex portion is made to be low.

However, in the case of the combination of materials whereby the difference in the refractive index between the concave portion and the convex portion becomes large, the reflectivity is high at an interface of the convexo-concave structure such as an interface of these materials or interfaces between air and these materials, the light utilization efficiency is thereby low, and stray light thereby results, such being problematic. In a case where, by a projection device or a measuring device, many light spots are formed, or return light (scattered light or the like) of light applied by the formed light spot is measured, a high accuracy cannot be obtained due to these problems.

Thus, it is an object of the present invention to provide a diffractive optical element whereby light spots having a predetermined pattern can be stably formed, and the light utilization efficiency is high, a projection device provided with the diffractive optical element and a measuring device.

Solution to Problem

The diffractive optical element of the present invention is a diffractive optical element having a convexo-concave pattern to generate two-dimensional phase distribution, which two-dimensionally diffracts incident light into plural diffracted light rays, which comprises a transparent substrate, a convexo-concave portion formed so as to be in contact with one surface of the transparent substrate and a filling portion with which the concave portions of the convexo-concave portion are filled and which covers top surfaces of convex portions of the convexo-concave portion for planarizing the convexo-concave portion, wherein the convexo-concave portion has at least two stages on the surface of the transparent substrate; the top surfaces of the respective stages are parallel to one another; among the transparent substrate, the convexo-concave portion and the filling portion, the refractive indexes of at least the convexo-concave portion and the filling portion are different with respect to the incident light which enters from the normal direction of the surface of the transparent substrate; and all values of n1, n2 and n3, are at most 2.2, wherein n1, n2 and n3 are refractive indexes of the transparent substrate, the convexo-concave portion and the filling portion respectively with respect to the incident light.

Further, the diffractive optical element of the present invention is a diffractive optical element having a convexo-concave pattern to generate two-dimensional phase distribution, which two-dimensionally diffracts incident light into plural diffracted light rays, which comprises a transparent substrate, a convexo-concave portion formed on one surface of the transparent substrate and a filling portion with which concave portions of convexo-concave portion are filled and which covers top surfaces of convex portions of the convexo-concave portion for planarizing the convexo-concave portion, wherein the convexo-concave portion has at least two stages on the surface of the transparent substrate; the top surfaces of the respective stages are parallel to one another; among the transparent substrate, the convexo-concave portion and the filling portion, the refractive indexes of at least the convexo-concave portion and the filling portion are different with respect to the incident light which enters from the normal direction of the surface of the transparent substrate; the diffractive optical element has a refractive index-controlling layer between the convexo-concave portion and the filling portion or between the transparent substrate and the convexo-concave portion; and the refractive index-controlling layer is a monolayer refractive index-controlling layer which satisfies the following equation (A) with respect to both interfaces of the refractive index-controlling layer or a refractive index-controlling layer consisting of at least one layer which satisfies a theoretical reflectivity R<4% by a multilayer structure, wherein $n_m$ is a refractive index of a medium which forms an incident side interface, $n_0$ is a refractive index of a medium which forms an emergent side interface, $n_r$ is a refractive index of the refractive index-controlling layer or each layer, and $d_r$ is the thickness:

$$(n_0 \times n_m)^{0.5} - \alpha < n_r < (n_0 \times n_m)^{0.5} + \alpha, \text{ and}$$

$$(1-\beta) \times \lambda/4 < n_r \times d_r < (1+\beta) \times \lambda/4, \quad \text{equation (A)}$$

wherein $\alpha=0.25$, $\beta=0.6$.

Further, the diffractive optical element of the present invention is a diffractive optical element having a convexo-concave pattern to generate two-dimensional phase distribution, which two-dimensionally diffracts incident light into plural diffracted light rays, which comprises a transparent substrate, a convexo-concave portion formed so as to be in contact with one surface of the transparent substrate and a filling portion with which concave portions of the convexo-concave portion are filled and which covers top surfaces of convex portions of the convexo-concave portion for planarizing the convexo-concave portion, wherein the convexo-concave portion has at least two stages on the surface of the transparent substrate; the top surfaces of the stages are parallel to one another; and each stage is constructed by stacking at least one base block, when the base block is a multilayer film consisting of at least 2 layers having a predetermined refractive index and thickness.

The projection device of the present invention is a projection device which projects light from a light source on a predetermined projection plane, which comprises a light source and any of the above mentioned diffractive optical elements as an optical element to enlarge an area irradiated with light emitted from the light source, wherein the proportion of the luminous energy of light projected on the predetermined projection plane is at least 50% to the luminous energy of light emitted from the light source.

The measuring device of the present invention is a measuring device which comprises a projection part to emit inspection light and a detection part to detect scattered light formed by irradiating an object to be measured with the inspection light emitted from the projection part, wherein the projection part is the above mentioned projection device.

Advantageous Effects of Invention

According to the present invention, a diffractive optical element whereby light spots having a predetermined pattern can be stably formed, and the light utilization efficiency is high, a projection device and a measuring device can be provided.

BRIEF DESCRIPTION OF DRAWINGS

FIGS. 7A and 7B are views showing results of calculation of diffraction efficiency of each order of diffracted light at each pitch of a convexo-concave portion 12.

DESCRIPTION OF EMBODIMENTS

Now, some embodiments of the present invention will be described with reference to drawings.

Embodiment 1

Figure 1:
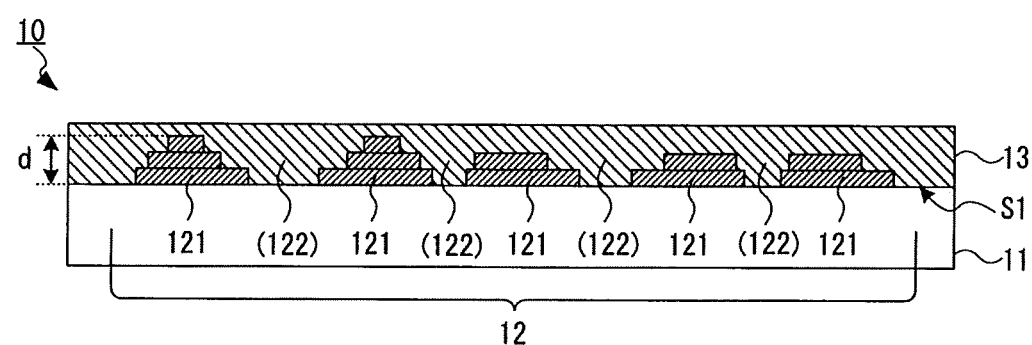
FIG. 1 is a schematic cross-sectional view of a diffractive optical element 10 in Embodiment 1.
Figure 2:
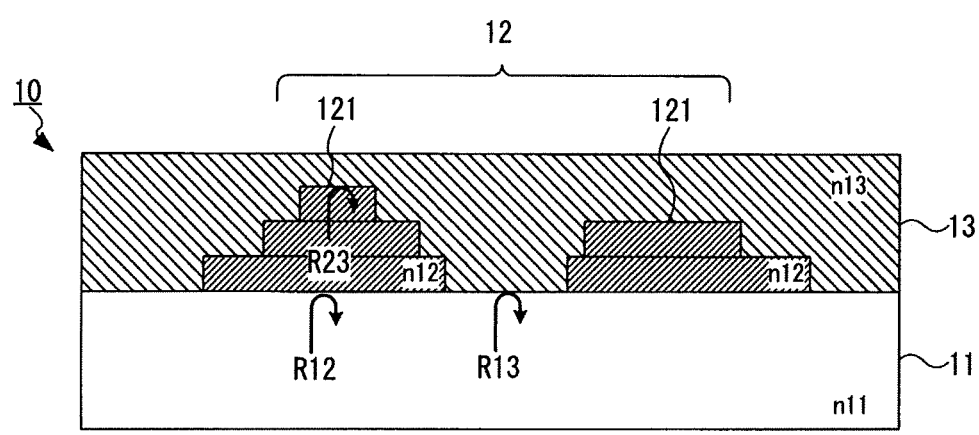
FIG. 2 is a schematic cross-sectional view illustrating an example of an interface reflection of a transparent substrate 11, a convexo-concave portion 12 and a filling portion 13.

FIGS. 1 and 2 are schematic cross-sectional views of a diffractive optical element 10 in Embodiment 1. The diffractive optical element 10 comprises a transparent substrate 11, a convexo-concave portion 12 formed so as to be in contact with one surface of the transparent substrate 11 and a filling portion 13 which covers the top surface of the convexo-concave portion 12 for planarization.

The diffractive optical element 10, for example, has a convexo-concave pattern to generate two-dimensional phase distribution, which two-dimensionally diffracts incident light into plural diffracted light rays. Here, the convexo-concave pattern is a two-dimensional pattern of a stage of a convex portion 121 of the above convexo-concave portion 12 in planar view. "Planar view" is a plane viewed from a traveling direction of light entering the diffractive optical element 10 and corresponds to a plane viewed from a normal direction of the principal plane of the diffractive optical element 10. As the convexo-concave pattern, base units having a specific convexo-concave pattern in planar view may be regularly arranged or may be irregularly arranged. The convexo-concave pattern may be designed so that respective formed light spots of plural diffracted light rays can realize a predetermined light pattern on a predetermined projection plane.

In Embodiment 1, the convexo-concave portion 12 is formed so as to be in contact with one surface (S1 in FIG. 1) of the transparent substrate 11. Further, as illustrated in FIG. 1, the convexo-concave portion 12 has at least two stages formed on the surface S1 of the transparent substrate 11, and the top surfaces of the respective stages are parallel to one another. Here, "parallel" means that a tilt angle to a base line or a base plane falls within 0.5°.

Viewed from the convexo-concave portion 12, a direction approaching the transparent substrate 11 is downward, and a direction away from the transparent substrate 11 is upward. Accordingly, an interface between the transparent substrate 11 and the convexo-concave portion 12 is the undermost surface of the convexo-concave portion 12, and a surface most distant from the transparent substrate 11 is the uppermost surface among the top surfaces of the respective stages of the convexo-concave portion 12.

In the present invention, regarding members constituting of the convexo-concave portion 12, one at a higher position than the lowest part on a surface where the convexo-concave portion is in contact with a filling portion, may be sometimes referred to as a convex portion of the convexo-concave portion. Further, a part which is a recessed portion surrounded by the convex portions and is lower than the uppermost surface of the convex portion, may sometimes be referred to as a concave portion of the convexo-concave portion. In a case where a convexo-concave portion is formed by shaving a surface of a transparent substrate 11, a plane at the lowest position in the convexo-concave structure on the surface is a boundary (the undermost surface of the convexo-concave portion and a surface of the transparent substrate) between the convexo-concave portion and the transparent substrate.

The filling portion 13 fills the concave portions 122 of the convexo-concave portion 12 without any space and covers the top surfaces of the convex portions 121 of the convexo-concave portion 12 to planarize the convexo-concave portions 12. The filling portion 13 has a part being in contact with a surface S1 of the transparent substrate 11.

Regarding the number of stages of the convexo-concave portion 12, each plane constituting a stage to form phase difference with respect to incident light is counted as one stage in the same manner as general diffraction gratings. In the convexo-concave portion 12, for example, assuming that light enters from the transparent substrate 11 side, a bottom surface of a concave portion, that is, a part where the filling portion 13 is in contact with the transparent substrate 11, is a first stage. Then, respective stages of the convex portion 121 are counted as a second stage and subsequent stages. Here, FIG. 1 illustrates a diffractive optical element having a convexo-concave portion 12 having at most 4 stages on the surface S1 of the transparent substrate 11.

Hereinafter, n11, n12 and n13 are the refractive indexes of the transparent substrate 11, the convexo-concave portion 12 and the filling part 13 respectively with respect to incident light from a normal direction of the surface S1 of the transparent substrate 11. Here, the refractive index n12 of the convexo-concave portion 12 and the refractive index n13 of the filling portion 13 may be average refractive indexes.

The refractive indexes of these members satisfy the following relations. First, n12≠n13 must be satisfied. Here, n12>n13, however, n12<n13 is possible. Further, from the viewpoint of the processability of the convexo-concave portion 12, |n12−n13|≥0.2 is preferred, |n12−n13|≥0.3 is more preferred, |n12−n13|≥0.45 is further preferred. Here, "refractive index" corresponds to a refractive index to incident light having a wavelength in the vicinity of the highest light intensity. For example, the range of ±20 nm or the range of ±10 nm with respect to the wavelength may be set, or the wavelength of the highest light intensity may be set.

As a material for the convexo-concave portion 12 and the filling portion 13, an inorganic material, an organic material or an organic-inorganic hybrid material may be used. As the organic material, a silicone resin or a polyimide resin may be preferably used, whereby high heat resistance can be obtained. As the inorganic material, an oxide, a nitride or an oxynitride of Zn, Al, Y, In, Cr, Si, Zr, Ce, Ta, W, Ti, Nd, Hf, Mg, La or the like, a fluoride of Al, Y, Ce, Ca, Na, Nd, Ba, Mg, La or Li, a silicon carbide or a mixture thereof, a transparent conductor such as ITO, Si, Ge, diamond-like carbon, one having an impurity such as hydrogen incorporated therein, or the like may be used.

Conventional resin materials have a refractive index of approximately 1.7 at the highest, whereby the difference between the refractive index of the convexo-concave portion 12 and the refractive index of the filling portion 13 is not made to be large in some cases. Thus, if the difference in level among stages of the convexo-concave portion 12 is high, the sensitivity to detect the path difference between the convexo-concave portion 12 and the filling portion 13 with respect to the difference in the refractive indexes becomes high, and as a result, the sensitivity to detect the diffraction efficiency becomes high. Accordingly, in a case where both the convexo-concave portion 12 and the filling portion 13 are made of resin materials, considering the temperature dependency, it is preferred that the temperature dependencies of the refractive index fluctuation of two materials are close to each other. More specifically, when the height d is a difference between the highest part and the lowest part on a surface where the convexo-concave portion 12 is in contact with the filling portion 13, Δn is the difference in the refractive index between two materials, the fluctuation of Δnd when the temperature is changed from 0° C. to 50° C. is preferably at most 5%, more preferably at most 3% of Δnd at 20° C. Further, in a case where the diffractive optical element is used under more severe conditions, the fluctuation of Δnd when the temperature is changed from −20° C. to 60° C., is preferably at most 5%, more preferably at most 3% of Δnd at 20° C. Further, the fluctuation of the diffraction efficiency at each temperature from the diffraction efficiency at 20° C. is preferably at most 10%, more preferably at most 5%, further preferably at most 3%. In general, the fluctuation of the diffraction efficiency at zeroth order is maximum among the orders of the diffraction efficiency. Thus, the fluctuation of the diffraction efficiency may be evaluated with the diffraction efficiency at zeroth order.

For example, when L is path difference at 20° C., δL is the variation of L due to the temperature change, δΔn is the variation of Δn, and δd is the variation of d, L+δL=(Δn+δΔn)(d+δd). L=Δn×d, and δL=(d/L)δd+δΔn, provided that the small value of the second order is ignored. Thus, when Δn decreases, d becomes large, and when the same δΔn results, the variation of δL becomes large. (d/L) corresponding to the coefficient of δL corresponds to the above mentioned "sensitivity".

Further, also in a case where the combination of the convexo-concave portion 12 and the filling portion 13 is an organic material and an inorganic material, the fluctuations of the refractive indexes of the two materials due to the temperature change are quite different. In such a case, the two materials and the height d are controlled so that the value of Δnd will satisfy the above condition when the temperature is changed from 0° C. to 50° C., further from −20° C. to 60° C.

Further, a member transparent with respect to incident light e.g. glass may be used as the transparent substrate 11. Such a transparent material usually has a refractive index of at least 1.3.

Table 1 shows calculation results of the loss due to the reflection with respect to the combination of the refractive indexes n11, n12 and n13 of three members assuming the convexo-concave portion 12 constituting a two stage, that is binary diffraction grating.

TABLE 1

| Group No. | Refractive index Substrate n11 | Refractive index Convexo-concave portion n12 | Refractive index Filling portion n13 | Refractive index difference \|n12 − n13\| | Area ratio of convexo-concave portion A | Normal incidence reflectivity Interface 1 R12 [%] | Normal incidence reflectivity Interface 2 R13 [%] | Normal incidence reflectivity Interface 3 R23 [%] | Total $R_{all}$ [%] |
|---|---|---|---|---|---|---|---|---|---|
| 1 | 1.51 | 2.30 | 1.60 | 0.70 | 50% | 4.3 | 0.08 | 3.2 | 3.8 |
|   | 1.51 | 2.25 | 1.60 | 0.65 | 50% | 3.9 | 0.08 | 2.9 | 3.4 |
|   | 1.51 | 2.10 | 1.60 | 0.50 | 50% | 2.7 | 0.08 | 1.8 | 2.3 |
|   | 1.51 | 2.00 | 1.60 | 0.40 | 50% | 1.9 | 0.08 | 1.2 | 1.6 |
|   | 1.51 | 1.90 | 1.60 | 0.30 | 50% | 1.3 | 0.08 | 0.7 | 1.1 |
|   | 1.51 | 1.80 | 1.60 | 0.20 | 50% | 0.8 | 0.08 | 0.3 | 0.6 |
|   | 1.51 | 1.70 | 1.60 | 0.10 | 50% | 0.4 | 0.08 | 0.1 | 0.3 |
| 2 | 1.51 | 2.15 | 1.45 | 0.70 | 50% | 3.1 | 0.04 | 3.8 | 3.4 |
|   | 1.51 | 2.05 | 1.45 | 0.60 | 50% | 2.3 | 0.04 | 2.9 | 2.6 |
|   | 1.51 | 1.95 | 1.45 | 0.50 | 50% | 1.6 | 0.04 | 1.2 | 1.9 |
|   | 1.51 | 1.85 | 1.45 | 0.40 | 50% | 1.0 | 0.04 | 1.5 | 1.3 |
|   | 1.51 | 1.75 | 1.45 | 0.30 | 50% | 0.5 | 0.04 | 0.9 | 0.7 |
|   | 1.51 | 1.65 | 1.45 | 0.20 | 50% | 0.2 | 0.04 | 0.4 | 0.3 |
|   | 1.51 | 1.55 | 1.45 | 0.10 | 50% | 0.0 | 0.04 | 0.1 | 0.1 |
| 3 | 1.51 | 2.15 | 1.45 | 0.70 | 40% | 3.1 | 0.04 | 3.8 | 2.8 |
|   | 1.51 | 2.05 | 1.45 | 0.60 | 40% | 2.3 | 0.04 | 2.9 | 2.1 |
|   | 1.51 | 1.95 | 1.45 | 0.50 | 40% | 1.6 | 0.04 | 2.2 | 1.5 |
|   | 1.51 | 1.85 | 1.45 | 0.40 | 40% | 1.0 | 0.04 | 1.5 | 1.0 |
|   | 1.51 | 1.75 | 1.45 | 0.30 | 40% | 0.5 | 0.04 | 0.9 | 0.6 |
|   | 1.51 | 1.65 | 1.45 | 0.20 | 40% | 0.2 | 0.04 | 0.4 | 0.3 |
|   | 1.51 | 1.55 | 1.45 | 0.10 | 40% | 0.0 | 0.04 | 0.1 | 0.1 |
| 0 | 1.51 | 1.45 | 1.00 | 0.45 | 50% | 0.0 | — | 3.4 | 3.4 |

In Table 1, the calculation of the reflectivity is carried out under assumption that light is incident on an interface vertically when entering each of two media differing in the refractive index. Further, the effect due to interference by a thin film is ignored. That is, the calculation is carried out by the equation (1) with the reflectivity R12 at an interface between the two materials of the transparent substrate 11 and the convexo-concave portion 12, the reflectivity R13 at an interface between the two materials of the transparent substrate 11 and the filling portion 13 and the reflectivity R23 at an interface between the two materials of the convexo-concave portion 12 and the filling portion 13, as illustrated in FIG. 2.

Further, the total reflectivity $R_{all}$ of the respective interfaces is calculated by the equation (2). Here, A is the proportion of the area where a member having a higher refractive index between the convexo-concave portion 12 and the filling portion 13 is in contact with the transparent substrate 11 in the effective field of incident light in the surface S1, when the surface S1 of the transparent substrate 11 is viewed from above. Here, the effective field of incident light is a field where incident light has a light intensity of at least $1/e^2$. That is, the effective field is a field irradiated with light having a light intensity of at least 13%, based on the light intensity of the incident light at the highest (position) is 100%. In Embodiment 1, A is the proportion of the area where the convexo-concave portion 12 is in contact with the transparent substrate 11, provided that the refractive indexes with respect to light having a wavelength of 950 nm satisfy n12>n13.

$$R12=(n11-n12)^2/(n11+n12)^2$$

$$R13=(n11-n13)^2/(n11+n13)^2$$

$$R23=(n12-n13)^2/(n12+n13)^2 \quad (1)$$

$$R_{all}=A\times(R12+R23)+(1-A)\times R13 \quad (2)$$

In Table 1, group 1 is an estimate of the reflectivity in a case where the refractive index difference |n12−n1| is changed from 0.1 to 0.7 at an interval of approximately 0.1, provided that n11<n13<n12 and A=50%. Further, group 2 is an estimate of the reflectivity in a case where the refractive index difference |n12−n13| is changed from 0.1 to 0.7 at an interval of approximately 0.1, provided that n13<n11<n12 and A=50%. Further, group 3 is an estimate of the reflectivity in a case of A=40% in the combination of the refractive indexes of group 2. Further, group 0 is results of the calculation of the interface reflection in a case of a structure having no filling portion 13 as a comparative example, that is in a case where the concave portions 122 are filled with air, and a quartz substrate is directly processed.

By comparison between group 1 and group 2 in Table 1, although the refractive index differences are approximately the same, group 2 has a smaller reflectivity $R_{all}$. Further, by comparison between group 2 and group 3 which have the same refractive index relation, although the refractive index differences are the same, group 3 has a smaller reflectivity $R_{all}$.

Accordingly, by controlling the refractive indexes of the transparent substrate 11, the convexo-concave portions 12 and the filling portion 13 so as to satisfy n13<n11<n12, the reflectivity can be further lowered as compared with a case where the refractive index differences of the concave portions 122 (filling portion 13) and the convex portions 121 are the same. Further, by controlling the area ratio of the convex portions 121 in the effective field in order that A<50%, more specifically by reducing the proportion of members made of a high refractive index material in the convexo-concave portion 12 and the filling portion 13, the reflectivity can be lowered.

Further, as compared with group 0, it is preferred to select a combination to achieve a reflectivity $R_{all}$ lower than the reflectivity $R_{all}$=3.4% of group 0 as the refractive indexes of materials for the transparent substrate 11, the convexo-concave portions 12 and the filling portion 13. In Examples in Table 1, all of n11, n12 and n13 are preferably at most 2.2, more preferably at most 2.0, further preferably at most 1.8.

Table 1 shows an estimate of a diffraction grating having the convexo-concave portion 12 having 2 stages. In a case of the convexo-concave portion 12 having multi stages, that is in a case of the convexo-concave portion 12 constituting a diffraction grating having at least 3 stages, the area ratio of the convex portions 121 in the convexo-concave portion 12 will be at least 50% in many cases. Thus, in a case where n12>n13, and the convexo-concave portion 12 has multi stages (at least 3 stages), A will be at least 50%, whereby the amount of reflection tends to be large. In such a case, all of n11, n12 and n13 are preferably at most 1.96, more preferably at most 1.8. On the other hand, In a case of multi stages and n12<n13, all of n11, n12 and n13 are preferably at most 2.1, more preferably at most 1.9.

Further, as the relation between the transparent substrate 11 and the filling portion 13, with a view to suppressing the reflection at an interface with the transparent substrate 11, particularly in a case of n12>n13, |n11−n13|≤0.3 is preferred, and |n11−n13|≤0.2 is more preferred. In a case of n13>n12, |n11−n12|≤0.3 is preferred, |n11−n12|≤0.2 is more preferred.

Further, the reflectivity as the entire diffractive optical element 10 is preferably at most 10%. More specifically, the reflectivity is preferably at most 6%, more preferably at most 4%, further preferably at most 3%. Here, the sum of the reflectivities at interfaces of the transparent substrate 11, the convexo-concave portion 12 and the filling portion 13, that is the reflectivity of 3 members-lamination structure is preferably at most 8%. More specifically, the reflectivity is preferably at most 4%, more preferably at most 2%, further preferably at most 1%. Here, the reflectivity of 3 member-lamination structure may be evaluated as the above mentioned $R_{all}$, however, considering the interference, the reflectivity may be evaluated as a theoretical reflectivity of multilayer structure represented by the after-mentioned equation (7).

Now, the diffraction function caused by the diffractive optical element 10 will be described with reference to a light pattern formed by the diffractive optical element 10 illustrated in FIG. 3. The diffractive optical element 10 is formed so that outgoing diffracted light rays 22 will be two-dimensionally distributed, with respect to incident light 21 as light axis direction is Z-axis. In a case where X-axis and Y-axis have an intersection point with Z-axis and are perpendicular to Z-axis, the diffractive optical element 10 has a distribution of rays of incident light within an angular range of from the minimum angle $\theta x_{min}$ to the maximum angle $\theta x_{max}$ on X-axis and from the minimum angle $\theta y_{min}$ to the maximum angle $\theta y_{max}$ on Y-axis (they are not illustrated).

Here, X-axis is nearly parallel to a long side of a light spot pattern, and Y-axis is nearly parallel to a short side of the light spot pattern. The range to be irradiated with diffracted light rays 22 of from the minimum angle $\theta x_{min}$ to the maximum angle $\theta x_{max}$ in the X-axis direction and from the minimum angle $\theta y_{min}$ to the maximum angle $\theta y_{max}$ in the Y-axis direction nearly corresponds to a light detection range of a light detection element to be used with the diffractive optical element 10. In this example, in the light spot pattern, a straight line parallel to Y-axis which passes a light spot having an angle of $\theta x_{max}$ in the X-direction to the Z-axis is the above short side, and a straight line parallel to X-axis which passes a light spot having an angle of $\theta y_{max}$ in the Y-direction to Z-axis is the above long side. Hereinafter, $\theta_d$ is an angle between the Z-axis and a straight line connecting an intersection point of the above short side and the above long side and a diffractive optical element, and this angle is referred to as angle in a diagonal direction.

In the diffractive optical element 10, for example, an angle $\theta_d$ in a diagonal direction of each of formed diffracted light rays (light spot) when incident light enters from a normal direction to the surface S1 of the transparent substrate 11, may be at least 7.5° or may be at least 15°. Further, the number of light spots to be formed by the diffractive optical element 10 may be at least 4, may be at least 9, may be at least 100 or may be at least 10,000. The upper limit of the number of light spots is not particularly restricted, and may, for example, be 10,000,000 points.

Further, a cross-section of the convexo-concave structure of the diffractive optical element is usually a binary shape, a blaze shape or the like. However, if the cross-section of the convexo-concave structure of the diffractive optical element is a shape other than the continuous blaze shape or if although the cross-section is a blaze shape, manufacturing variations result, stray light may results in addition to the desired diffracted light. However, such stray light is not intended in the design stage and thereby not included in light spots distributed in the above angular range.

Figure 3:
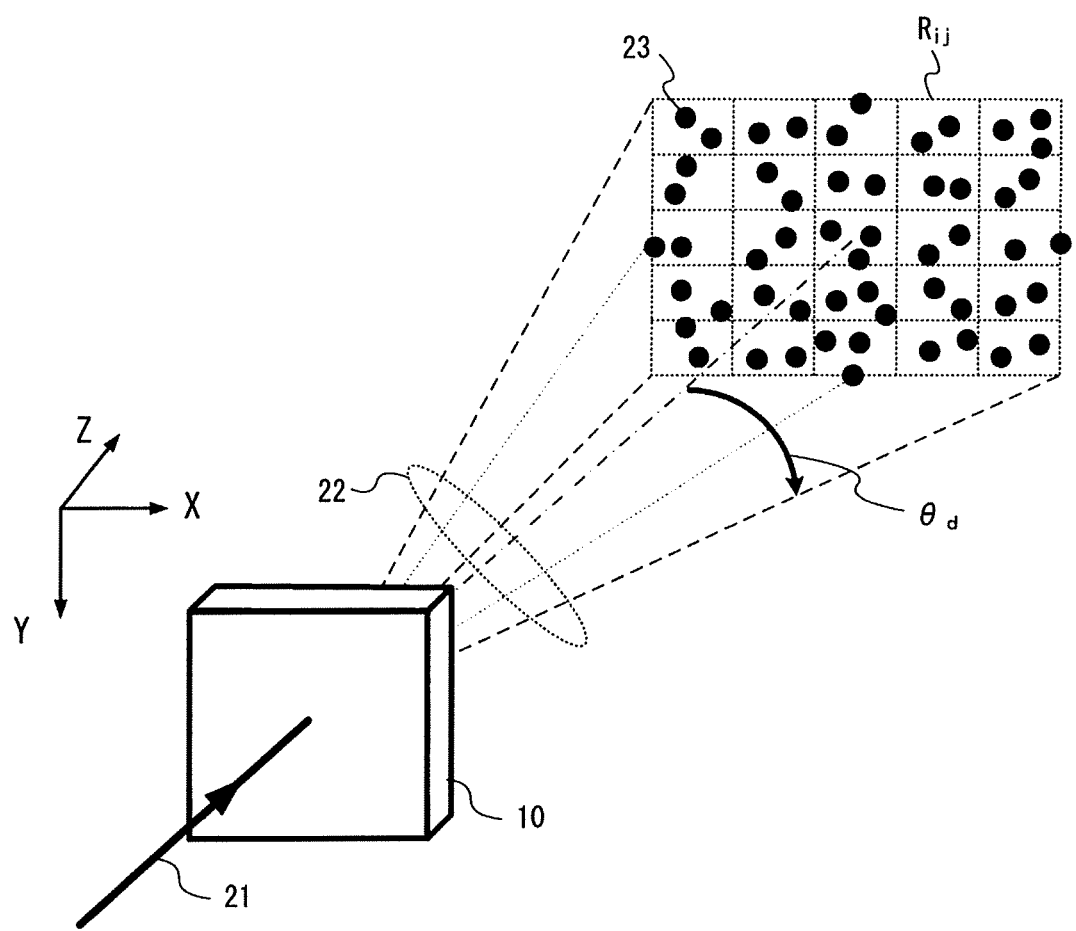
FIG. 3 is a view illustrating an example of a light pattern formed by a diffractive optical element 10.

Further, in FIG. 3, $R_{ij}$ represents a divided region of a projection plane. For example, in a case where a projection plane is divided into plural regions $R_{ij}$, the diffractive optical element 10 may be designed so that the distribution density of light spots 23 of diffracted light rays 22 projected on each region $R_{ij}$ will be within ±50% to the average value of the entire regions. The above distribution density may be within ±25% to the average value of the entire regions. The diffractive optical element 10 having such a structure is suitable in applications for measurement, etc., since the distribution of light spots 23 is made to be uniform on the projection plane. Here, the projection plane may be a curved plane as well as a flat plane. Further, the flat plane may be an inclined plane other than a plane which is perpendicular to a light axis of the optical system.

Each diffracted light included in diffracted light rays 22 illustrated in FIG. 3 is light diffracted at an angle $\theta_{xo}$ in the X-direction and at angle $\theta_{yo}$ in the Y-direction on the basis of the Z-axis direction, in the diffraction grating equation represented by the equation (3). In the equation (3), $m_x$ is the diffraction order in the X-direction, $m_y$ is the diffraction order in the Y-direction, $\lambda$ is a wavelength of incident light 21, $P_x$ and $P_y$ are pitches in the X-axis direction and the Y-axis direction of the after mentioned base unit of the diffractive optical element, $\theta_{xi}$ is an incident angle to the diffractive optical element in the X-direction, and $\theta_{yi}$ is an incident angle to the diffractive optical element in the Y-direction. The diffracted light rays 22 are applied to a projection plane of a screen, an object to be measured or the like, whereby plural light spots 23 are formed in a projected region.

$$\sin \theta_{xo} = \sin \theta_{xi} + m_x \lambda / P_x$$

$$\sin \theta_{yo} = \sin \theta_{yi} + m_y \lambda / P_y \quad (3)$$

As the diffractive optical element 10 to emit diffracted light rays 22 satisfying such predetermined conditions, a diffractive optical element designed by iterative Fourier-transform may be used. More specifically, a diffractive optical element in which base units to generate a predetermined phase distribution are periodically e.g. two-dimensionally arranged, may be used. In such a diffractive optical element, the distribution of the diffraction order of faraway diffracted light is obtained by the Fourier-transform for the base units.

Figure 4A:
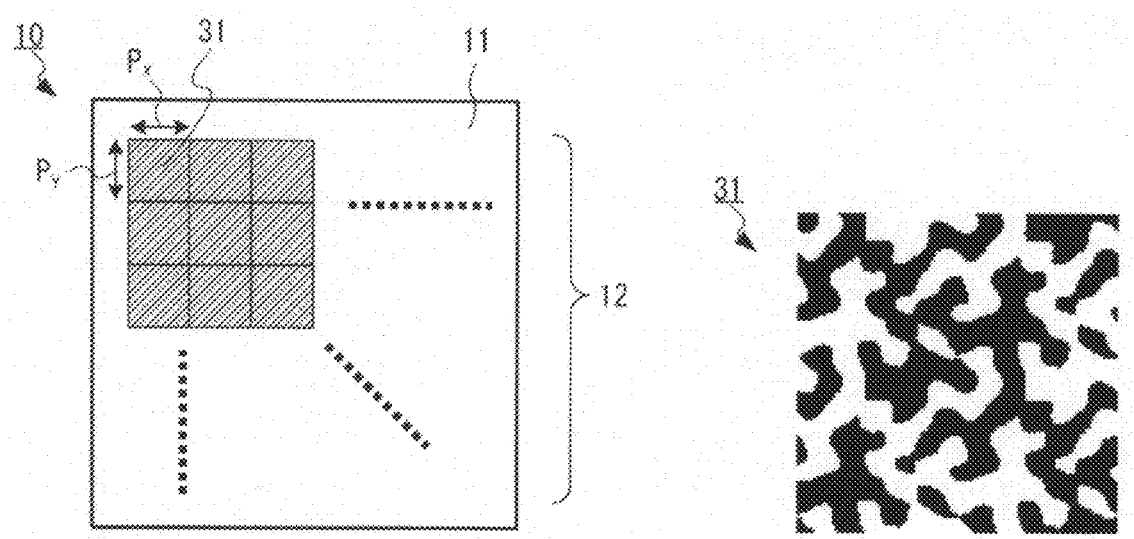
FIGS. 4A-4C are views schematically illustrating an example of a convexo-concave portion 12 of a diffractive optical element 10 in Embodiment 1.
Figure 4B:
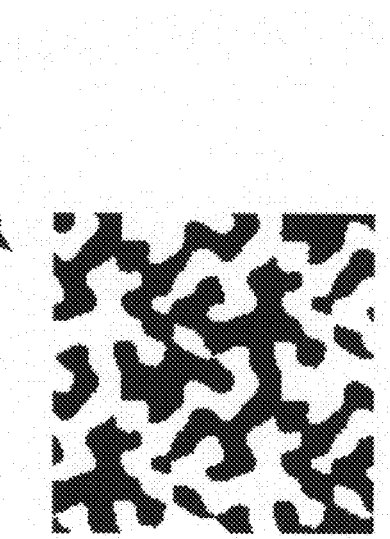
Figure 4C:
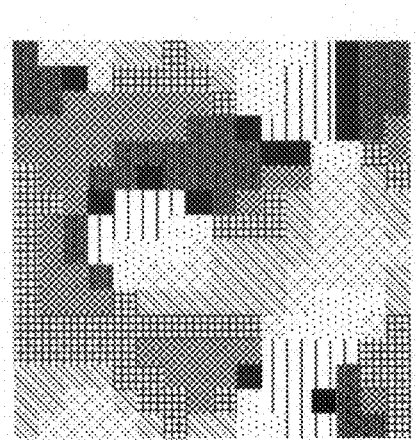

As illustrated in FIG. 4A, in the diffractive optical element 10, base units 31 constituting the convexo-concave portion 12 may be periodically arranged in the two-dimensional state at a pitch $P_x$ in the X-axis direction and at a pitch $P_y$ in the Y-axis direction on the transparent substrate 11. For example, the base unit 31 has a phase distribution as illustrated in FIGS. 4B and 4C. In an example illustrate in FIG. 4B, a convexo-concave pattern is formed so that black regions will be convex portions 121, and white regions will be concave portions 122. An example illustrated in FIG. 4C is an example of phase distribution having phase differences of 8 stages, and a convexo-concave pattern is formed so that each painted pattern will correspond to each stage of the convexo-concave portion 12. A structure having a convexo-concave pattern formed on a surface of a member (transparent substrate 11) which transmits light such as glass or a resin material is included in the convexo-concave portion 12, so long as phase distribution can be generated. The diffractive optical element 10 may have not only a structure having a transparent member (transparent substrate 11) on which a convexo-concave pattern is formed, and a member (filling portion 13) having a refractive index different from the transparent member followed by planarizing a surface, but also a structure formed by changing a refractive index of the transparent member. That is, the convexo-concave pattern not only means formed on the transparent member, a structure wherein the surface shape has convexes and concaves but also includes a structure which imparts phase difference to incident light.

Further, the number of base units 31 arranged in the two-dimensional state in the diffractive optical element 10 is not necessarily an integral number, and so long as at least one base unit is contained in a convexo-concave pattern, the boundary between a region having a convexo-concave pattern and a region having no convexo-concave pattern may not agree with the boundary of the base unit. Further, the base unit 31 is not limited to one type and may be plural types.

The diffractive optical element having a two-dimensional periodic structure has been described, however, the diffractive optical element 10 may have a non-periodic convexo-concave structure which two-dimensionally diffuses light, a convexo-concave structure which diffracts light in one dimensional direction or a convexo-concave structure having a Fresnel lens structure having a lens function. Even though the interface between the transparent substrate 11 and the convexo-concave portion 12 and the top surfaces of the stages of the convexo-concave portion 12 are not parallel to each other, by satisfying the above described relation of the refractive indexes, the effect to decrease the reflectivity accompanying the refractive index difference at an interface of the convexo-concave portion can be obtained.

In a case where the convexo-concave portion 12 has a pseudo blaze shape in the form of stairs having N stages, and $d \times (n12 - n13)/\lambda = (N-1)/N$ is satisfied wherein the height d is a difference between the highest part and the lowest part on a surface where the convexo-concave portion 12 is in contact with the filling portion 13, the path difference formed by the convex portions 121 and the concave portions 122 (filling portion 13) approximates a wave surface per one wavelength, whereby high diffraction efficiency can be obtained.

Further, irrespective of the shape of the convexo-concave portion 12, the height of each stage of the convexo-concave portion 12 is preferably set so that the distance from the transparent substrate 11 to an interface between the convexo-concave portion 12 and the filling portion 13 is an optical path length to be an integral multiple of half wavelength of the predetermined wavelength in wavelengths included in the entire wavelength range of the incident light. This requirement is not necessarily applied to all stages. That is, preferred is a structure such that at any stage of the convexo-concave portion 12, the distance from the transparent substrate 11 to the top surface of the stage corresponds to an optical path length of the integral multiple of a half wavelength of the designed wavelength. This is because a layer having the distance corresponding to the optical path length of the integral multiple of a half wavelength is a layer having optically no function. Particularly, the optical path length in at least two stages is preferably the integral multiple of a half wavelength. For example, in a case where the convexo-concave portion has at least 4 stages, the optical path length in at least half stages may be an integral multiple of a half wavelength. Here, the integral multiple of a half wavelength means one satisfying $0.5m-0.15 < n_r \times d_r/\lambda < 0.5m+0.15$, wherein m is an integral number. $n_r$ is a refractive index of a medium as an object to calculate the optical path length and is a refractive index n12 of the convexo-concave portion 12 here. $d_r$ is a height of a medium as an object to calculate the optical path length and is a height of each stage of the convexo-concave portion 12 here. Further, the designed wavelength may be a wavelength having the highest light intensity in the incident light.

Further, irrespective of the shape of the convexo-concave portion 12, the height d of the convexo-concave is preferably low from the viewpoint of the processability. Accordingly, the value of |n12−n13| is preferably at least 0.2, more preferably at least 0.3, further preferably at least 0.45.

Figure 5A:
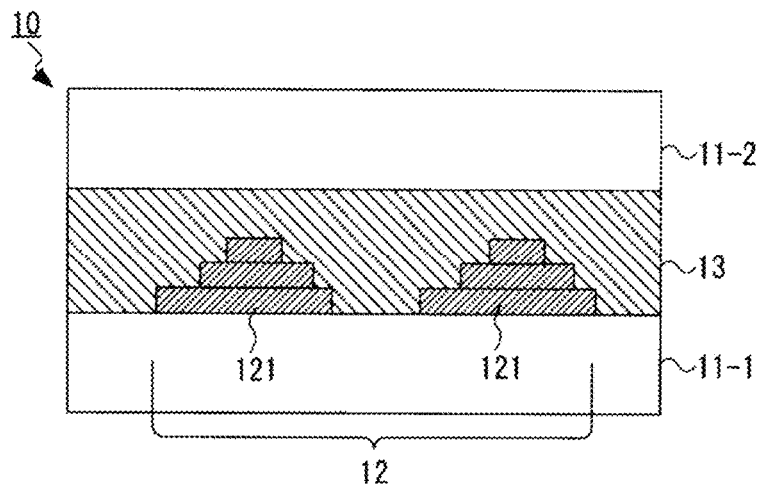
FIGS. 5A and 5B are schematic cross-sectional views illustrating another example of a diffractive optical element 10 in Embodiment 1.
Figure 5B:
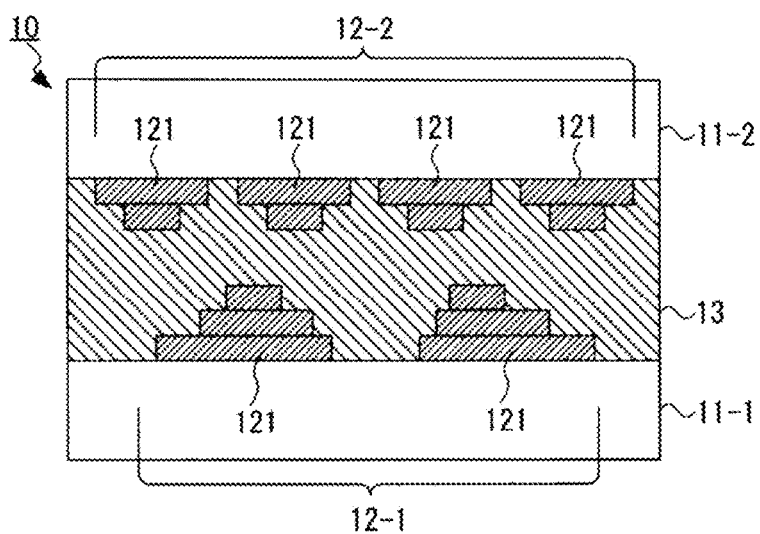

Further, in FIG. 1, the filling portion 13 is exposed, however, as illustrated in FIG. 5A, the diffractive optical element may have a structure such that the top surface of the filling portion 13 is sealed with another substrate (11-2). Here, an antireflection film may be formed at an interface between each substrate (11-1, 11-2) and air. Without the second transparent substrate 11-2, an antireflection film may be formed on the top surface of the filling portion 13 exposed to air. Further, as illustrated in FIG. 5B, a convexo-concave pattern layer (convexo-concave portions 12) having a diffraction function is not limited to one, and the diffractive optical element 10 may have plural convexo-concave pattern layers (convexo-concave portions). In such a case, the diffractive optical element may have a structure such that two diffractive optical elements are laminated or may have a structure such that two convexo-concave portions (12-1 and 12-2) are integrated via the filling portion 13 as illustrated in FIG. 5B.

In the above description, the structure based on the reflectivity at the interface between the convexo-concave portion 12 and other medium is described, however, in an actual diffractive optical element, it is difficult in some cases to measure the luminous energy, since reflected light is branched into plural reflected diffracted light rays due to the diffraction function of the convexo-concave structure. In such a case, the luminous energy of reflected light may be evaluated as the luminous energy of transmitted light. Light emerging from an emergent surface facing an incident surface of the diffractive optical element is received by a light receiving element such as an integrating sphere adjacent to the element, and its luminous energy is measured to evaluate the luminous energy of the transmitted light. For example, the luminous energy of transmitted light may be evaluated by the forward transmittance which is the proportion of the luminous energy of received light to the luminous energy of incident light. Here, the luminous energy of transmitted light is one obtained by deducting from the luminous energy of incident light, reflection at interfaces of the transparent substrate 11, the convexo-concave portion 12 and the filling portion 13 and also deducting the absorption of the element, reflection at the incident side element interface and reflection at the emergent side element interface.

Further, for example, the luminous energy of transmitted light may be evaluate by using a theoretical value obtained by diffraction grating equation for each diffracted light as described hereinafter. In such a case also, it is estimated that the absorption in the element and the reflection at an interface of the element will not result in the diffractive optical element other than the reflection at interfaces of the transparent substrate 11, the convexo-concave portion 12 and the filling portion 13.

Figure 6:
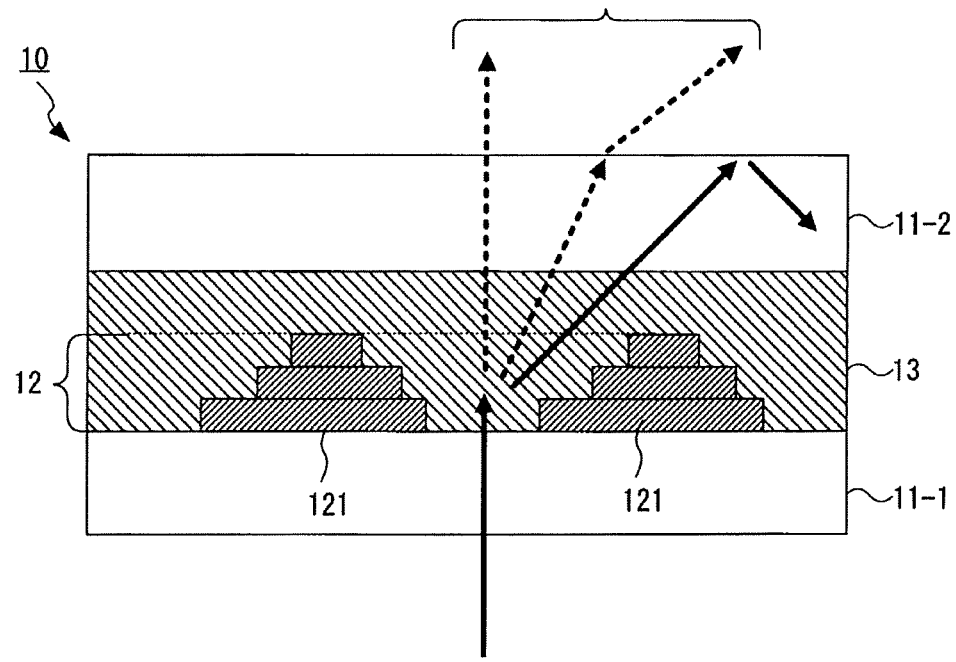
FIG. 6 is a schematic cross-sectional view illustrating an example of propagation of diffracted light in a diffractive optical element 10.

In the case of the diffractive optical element in Embodiment 1, in addition to two factors of (A) reflection at interfaces of the substrate, the convexo-concave portion and the filling portion and (B) absorption by the members constituting the substrate, the convexo-concave portion and the filling portion, it is necessary to consider (C) components of diffracted light propagating in the element without emerging from the interface of the element. For example, such components are light rays totally reflected at any surface in the element as illustrated by solid line arrows in FIG. 6, and it may, for example, be calculated by the equation (3). In the equation (3), the vector component of light rays in the Z direction is $(1-\sin^2\theta_{xo}-\sin^2\theta_{yo})^{0.5}$, and in a case where the value in the parentheses is negative, the propagation vector component of the Z component is an imaginary number and may be considered as a component which is not emitted into air. Strictly, in some cases, diffracted light propagating in the element is totally reflected at an interface of the element, re-enters the convexo-concave portion and re-diffracted in the element, however, it is assumed for simplification in the following that such disturbance will not occur.

As a specific example, a diffractive optical element to form 21 light spots of diffracted light will be described. Base units of a convexo-concave pattern in the diffractive optical element are designed based on calculation of repeating a fast Fourier-transform. FIG. 7A shows the diffraction efficiency at each order in x-direction (horizontal axis) and in y-direction (vertical axis) in a case where as a convexo-concave pattern of the diffractive optical element, base units are arranged at a pitch of 3.6 μm respectively in two axis directions crossing perpendicularly. In the case of the present example, incident light has a wavelength of 950 nm, and light of the black painted order is diffracted light as represented by solid line arrows in FIG. 6 and totally reflected at an emergent side interface of the element and cannot emerge from the diffractive optical element to the outside. Here, in a case where no loss due to reflection or absorption is assumed, the proportion of the luminous energy of forward transmitting light per incident light is 92.3% in the diffractive optical element of Embodiment 1. Further, as shown in FIG. 7A, the total diffraction efficiency of 21 points is 85.2% in this example.

Further, FIG. 7B shows the diffraction efficiency at each order in x-direction and in y-direction in a case where base units are arranged at a pitch of 6.6 μm respectively in two axis directions perpendicularly crossing. The diffraction efficiency at each order and the meaning of black painted parts are the same as in FIG. 7A. In this example, if the loss due to reflection or absorption will not occur, the proportion of the luminous energy of forward transmitting light per incident light is 95.4% in the diffractive optical element of Embodiment 1. Further, as shown in FIG. 7B, in this example, the total diffraction efficiency of 21 points is 85.2%.

As already described, the forward transmittance may be evaluated by a light receiving element such as an integrating sphere. Here, components propagating in the element by the total reflection at an emergent side interface of the element as shown in solid lines in FIG. 6, can be evaluated by measuring light emerging from the element side by a light receiving device. If it is assumed that light is not absorbed by the diffractive optical element, the reflectivity as the diffractive optical element can be evaluated by deducting from the incident luminous energy, the forward transmittance and the luminous energy emerging from the diffractive optical element side.

As described above, the value of the forward transmittance varies depending on the design of the diffraction order in some cases. Particularly, in a case of a diffractive optical element which diffracts light into wide angle diffracted light, the above variation tends to be remarkable. Further, in a case where the reflectivity at interfaces of the transparent substrate, the convexo-concave portion and the filling portion is low, the forward transmittance is made to be relatively high. Accordingly, the forward transmittance as an index of the evaluation of the luminous energy of reflected light is at least 80%, preferably at least 85%, more preferably at least 90%, further preferably at least 95%. Further, the diffractive optical element may have another functional layer in some cases, however, a simple structure having only one convexo-concave portion is assumed for the above forward transmittance. On the other hand, in a case of the diffractive optical element having another functional layer, the forward transmittance may be evaluated by calculating loss due to absorption or reflection by such another functional layer and excluding it. Further, the loss due to reflection or absorption at a part other than the interface of the transparent substrate, the convexo-concave portion and the filling portion is calculated and evaluated, and it may be excluded. Further, the total diffraction efficiency of the designed diffracted light is at least 70%, preferably at least 75%, more preferably at least 80%, further preferably at least 85%, since undesired diffracted light other than the designed diffracted light may result at a level of 10% in some cases.

The convexo-concave portion 52 has a first layer 523 covering a surface of the transparent substrate 51 in at least the effective field of incident light. Thus, the diffractive optical element 50 has a structure such that the filling portion 53 is not in contact with the transparent substrate 51 in at least the effective field. In the convexo-concave portion 52, the top surface of the first layer 523 is a first stage.

Further, a member for the convexo-concave portion 52 is different from a member for the transparent substrate 51. Hereinafter, n51, n52 and n53 are the refractive indexes of the transparent substrate 51, the convexo-concave portion 52 and the filling portion 53 to incident light from a normal direction of the surface S1 of the transparent substrate 51 respectively. In also Embodiment 2, n52 and n53 may be the average refractive indexes.

Table 2 shows examples of calculation results of loss due to reflection depending on the combination of the refractive indexes of three members in a case of a convexo-concave portion 52 having two stages.

TABLE 2

| Group No. | Substrate n51 | Refractive index Convexo-concave portion n52 | Filling portion n53 | Refractive index difference \|n52 − n53\| | Normal incidence reflectivity Interface 1 R52 [%] | Interface 2 R53 [%] | Total $R_{all}$ [%] |
|---|---|---|---|---|---|---|---|
| 4 | 1.51 | 2.20 | 1.50 | 0.70 | 3.5 | 3.6 | 7.0 |
|   | 1.51 | 2.10 | 1.50 | 0.60 | 2.7 | 2.8 | 5.4 |
|   | 1.51 | 1.96 | 1.50 | 0.46 | 1.7 | 1.8 | 3.4 |
|   | 1.51 | 1.90 | 1.50 | 0.40 | 1.3 | 1.4 | 2.7 |
|   | 1.51 | 1.80 | 1.50 | 0.30 | 0.8 | 0.8 | 1.6 |
|   | 1.51 | 1.70 | 1.50 | 0.20 | 0.4 | 0.4 | 0.7 |
|   | 1.51 | 1.60 | 1.50 | 0.10 | 0.1 | 0.1 | 0.2 |
| 5 | 1.51 | 1.45 | 2.20 | 0.75 | 0.0 | 4.2 | 4.3 |
|   | 1.51 | 1.45 | 2.10 | 0.65 | 0.0 | 3.4 | 3.4 |
|   | 1.51 | 1.45 | 1.96 | 0.51 | 0.0 | 2.2 | 2.3 |
|   | 1.51 | 1.45 | 1.90 | 0.45 | 0.0 | 1.8 | 1.8 |
|   | 1.51 | 1.45 | 1.80 | 0.35 | 0.0 | 1.2 | 1.2 |
|   | 1.51 | 1.45 | 1.70 | 0.25 | 0.0 | 0.6 | 0.7 |
|   | 1.51 | 1.45 | 1.60 | 0.15 | 0.0 | 0.2 | 0.3 |
| 0 | 1.45 | 1.45 | 1.00 | 0.45 | 0.0 | 3.4 | 3.4 |

Figure 8:
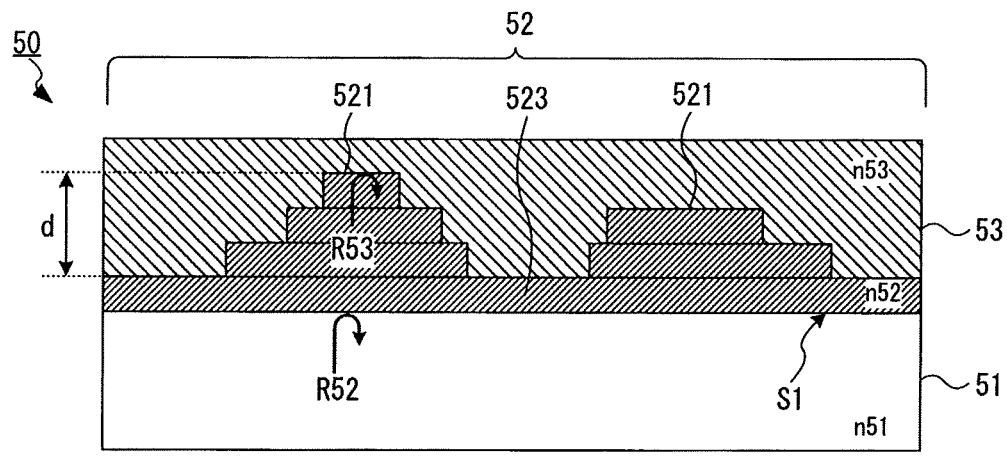
FIG. 8 is a schematic cross-sectional view of a diffractive optical element 50 in Embodiment 2.

The preconditions for calculating the reflectivity in Table 2 are the same as the conditions in Table 1. Further, reflectivity R52 at an interface between two materials of the transparent substrate 51 and the convexo-concave portion 52 and reflectivity R53 at an interface between two materials of the convexo-concave portion 52 and the filling portion 53 shown in FIG. 8 are calculated by means of the equation (4) respectively. Further, the total reflectivity $R_{all}$ at all interfaces is calculated by means of the equation (5). The refractive index of each member is a refractive index to light having a wavelength of 950 nm.

$$R52=(n51-n52)^2/(n51+n52)^2$$

$$R53=(n52-n53)^2/(n52+n53)^2 \quad (4)$$

$$R_{all}=R52+R53 \quad (5)$$

In Table 2, group 4 is an estimate of reflectivity in a case where the refractive index difference \|n52−n53\| is changed from 0.1 to approximately 0.7 at an interval of approximately 0.1 provided that n53<n51<n52. Further, group 5 is an estimate of reflectivity in a case where the refractive index difference \|n52−n53\| is changed from approximately Embodiment 2

FIG. 8 is a schematic cross-sectional view of a diffractive optical element 50 in Embodiment 2. The diffractive optical element 50 comprises a transparent substrate 51, a convexo-concave portion 52 being in contact with one surface of the transparent substrate 51 and a filling portion 53 to cover the top surface of the convexo-concave portion 52 for planarization.

0.1 to approximately 0.7 at an interval of approximately 0.1 provided that n52<n51<n53. Group 0 is the same as in Table 1.

In Table 2, based on comparison with group 0, for example, the diffractive optical element 50 preferably has a combination of the refractive indexes n51, n52 and n53 so that the reflectivity $R_{all}$ will be at most 3.4%. More specifically, in the case of n52>n53, all of n51, n52 and n53 are preferably at most 1.96, more preferably at most 1.8. Further, in the case of n52<n53, all of n51, n52 and n53 are preferably at most 2.1, more preferably at most 1.9.

Further, under conditions of the approximately same refractive index difference, group 5 is superior to group 4. Accordingly, it is preferred to satisfy the relation of n52<n51<n53 as group 5. Further, also in the present Embodiment, with a view to suppressing reflection at an interface with the transparent substrate 51, |n51−n52|≤0.3 is preferred, and |n51−n52|≤0.2 is more preferred.

The others are the same as in Embodiment 1. However, symbols in the description of Embodiment 1 are read as symbols for corresponding members. For example, in the case of other points including the relation of the refractive index between members (such as the height d or the temperature dependency of the refractive index variation), n11 is read as n51, n12 is read as n52 and n13 is read as n53. The height d is height which is the difference between the highest part and the lowest part on a surface where the convexo-concave portion 52 is in contact with the filling portion 53, similarly to Embodiment 1. In such a case, the height d is height excluding the thickness of the first layer 523.

Embodiment 3

Figure 9:
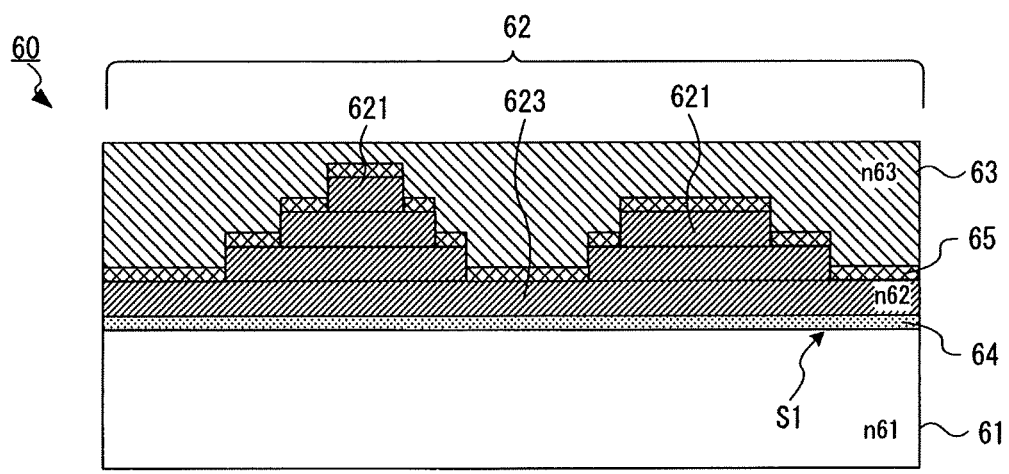
FIG. 9 is a schematic cross-sectional view of a diffractive optical element 60 in Embodiment 3.

FIG. 9 is a schematic cross-sectional view of a diffractive optical element 60 in Embodiment 3. The diffractive optical element 60 has a transparent substrate 61, a convexo-concave portion 62 on one surface of the transparent substrate 61 and a filling portion 63 to cover the top surface of the convexo-concave portion 62 for planarization. The diffractive optical element 60 further has a refractive index-controlling layer between the convexo-concave portion 62 and the filling portion 63 or between the transparent substrate 61 and the convexo-concave portion 62.

In an example illustrated in FIG. 9, a refractive index-controlling layer 64 is formed between the transparent substrate 61 and the convexo-concave portion 62. Further, a refractive index-controlling layer 65 is formed at least a part of a region where light transmits, between the convexo-concave portion 62 and the filling portion 63. FIG. 9 is an example of a diffractive optical element 60 having both refractive index-controlling layers 64 and 65, however, the diffractive optical element 60 may have a structure having only the refractive index-controlling layer 64 or only the refractive index-controlling layer 65.

Hereinafter, n61, n62 and n63 are refractive indexes of the transparent substrate 61, the convexo-concave portion 62 and the filling portion 63 respectively, with respect to incident light from a normal direction on the surface S1 of the transparent substrate 61. In also Embodiment 3, n62 and n63 may be average refractive indexes.

The refractive index-controlling layer is particularly effective when any of the refractive indexes of the transparent substrate 61, the convexo-concave portion 62 and the filling portion 63 is high, and for example, when any of n61, n62 and n63 is at least 1.7, it is effective such that the interface reflection due to the convexo-concave structure can be particularly suppressed. Any of n61, n62 and n63 is preferably at least 1.9, further preferably at least 2.1.

The refractive index-controlling layers 64 and 65 may be a monolayer or a multilayer, so long as the after-mentioned conditions are satisfied. The refractive index-controlling layer 65 is preferably a thin film of a monolayer.

Further, if pitches of the convexo-concave structure of the diffractive optical element are narrow due to an increase of stages of the convex portion 621 or the like, it may be difficult to form the refractive index-controlling layer 65 with an accuracy to maintain the diffraction efficiency with respect to the convexo-concave portion 62 in some cases. If the pitches are narrow, the influence of scattering due to a member of the refractive index-controlling layer 65 formed on a side surface of the convex portion 621 becomes large. Accordingly, as a structure having the refractive index-controlling layer 65 so as not to narrow pitches of the convexo-concave structure, a convexo-concave portion 62 having two stages of the convex portion 621 may be employed.

Further, in a case where monolayer thin films are used as the refractive index-controlling layers 64 and 65, it is preferred to satisfy the following equation (6). In the equation (6), $n_r$ is a refractive index of a material for the refractive index-controlling layer to be an object, $d_r$ is a thickness, $n_m$ is a refractive index of a medium to form an incident side interface of the refractive index-controlling layer to be an object, and $n_0$ is a refractive index of a medium to form an emergent side interface. In such a case, the reflectivity at an interface can be lowered. Here, α is 0.25, and β is 0.6. Hereinafter, the conditional equation represented by the equation (6) may sometimes be referred to as the first refractive index relation equation regarding the monolayer thin film. Further, α is more preferably 0.2, further preferably 0.1. β is more preferably 0.4.

$$(n_0 \times n_m)^{0.5} - \alpha < n_r < (n_0 \times n_m)^{0.5} + \alpha, \text{ and}$$

$$(1-\beta) \times \lambda/4 < n_r \times d_r < (1+\beta) \times \lambda/4 \qquad (6)$$

Table 3 shows examples of calculation results of the reflectivity in a case where the monolayer refractive index-controlling layer 64 is formed, as compared with a case where the refractive index-controlling layer is not formed. Table 3 is calculation results of the reflectivity with respect to $n_r$ and $n_r \times d_r$ under conditions of α≤0.25 and β≤0.6 regarding $(n_0 \times n_m)^{0.5} = 1.8$ under assumption that λ=950 nm, the refractive index n61 of the transparent substrate 61 of 1.513 (glass substrate), and the refractive index n62 of the convexo-concave portion 62 of 2.143 (TiO$_2$).

TABLE 3

| nr | $n_r \times d_r$ | | | | | | |
|---|---|---|---|---|---|---|---|
| | (1 − 0.6)λ/4 | (1 − 0.4)λ/4 | (1 − 0.2)λ/4 | λ/4 | (1 + 0.2)λ/4 | (1 + 0.4)λ/4 | (1 + 0.6)λ/4 |
| $(n_0 \times n_m)^{0.5} - 0.25$ | 2.7% | 2.5% | 2.3% | 2.2% | 2.3% | 2.4% | 2.7% |
| $(n_0 \times n_m)^{0.5} - 0.2$ | 2.4% | 1.9% | 1.5% | 1.4% | 1.5% | 1.9% | 2.4% |
| $(n_0 \times n_m)^{0.5} - 0.1$ | 2.1% | 1.3% | 0.6% | 0.3% | 0.6% | 1.2% | 2.0% |

TABLE 3-continued

| | $n_r \times d_r$ | | | | | | |
|---|---|---|---|---|---|---|---|
| nr | $(1 - 0.6)\lambda/4$ | $(1 - 0.4)\lambda/4$ | $(1 - 0.2)\lambda/4$ | $\lambda/4$ | $(1 + 0.2)\lambda/4$ | $(1 + 0.4)\lambda/4$ | $(1 + 0.6)\lambda/4$ |
| $(n_0 \times n_m)^{0.5}$ | 2.0% | 1.1% | 0.3% | 0.0% | 0.3% | 1.0% | 1.9% |
| $(n_0 \times n_m)^{0.5} + 0.1$ | 2.1% | 1.3% | 0.6% | 0.3% | 0.5% | 1.2% | 2.0% |
| $(n_0 \times n_m)^{0.5} + 0.2$ | 2.3% | 1.8% | 1.3% | 1.1% | 1.3% | 1.7% | 2.3% |
| $(n_0 \times n_m)^{0.5} + 0.25$ | 2.5% | 2.1% | 1.8% | 1.7% | 1.8% | 2.1% | 2.5% |
| No refractive index-controlling layer | | | | 3.0% | | | |

Here, the function of the refractive index-controlling layer will be described. A case where light enters from a medium M1 having a refractive index $n_0$ at an incident angle $\theta_0$, transmits in a multilayer film M2 comprising q layers each having a refractive index $n_r$ and a thickness $d_r$ and enters a medium M3 having a refractive index $n_m$ will be considered. Here, the reflectivity is calculated by the equation (7). Further, $\eta_0$, $\eta_m$ and $\eta_r$ are effective refractive indexes of the medium M1, the multilayer film M2 and the medium M3 respectively considering glazing incidence.

$$R = \left(\frac{\eta_o - Y}{\eta_0 + Y}\right)\left(\frac{\eta_0 - Y}{\eta_0 + Y}\right)^* \quad (7)$$

$$\begin{pmatrix} B \\ C \end{pmatrix} = \left\{\prod_{r=1}^{q}\begin{bmatrix} \cos\delta_r & (i\sin\delta_r)/\eta_r \\ i\eta_r\sin\delta_r & \cos\delta_r \end{bmatrix}\right\}\begin{bmatrix} 1 \\ \eta_m \end{bmatrix}$$

$$Y = C/B$$

$$\eta_0 = \frac{\eta_0}{\cos\theta_0} \text{ (when } p \text{ polarization),}$$

$$\eta_o = \eta_0 * \cos\theta_0 \text{ (when } s \text{ polarization),}$$

$$\eta_m = \frac{\eta_m}{\cos\theta_m} \text{ (when } p \text{ polarization),}$$

$$\eta_m = \eta_m * \cos\theta_m \text{ (when } s \text{ polarization),}$$

$$\delta_r = 2\pi n_r d_r \cos\theta_r / \lambda$$

$$n_0 * \sin\theta_0 = n_m * \sin\theta_m = nr * \sin\theta_r$$

Accordingly, if a refractive index-controlling layer is not formed, $Y = \eta_m$, and relatively large reflection results, while if Y is made to be close to $\eta_0$ by the refractive index-controlling layer, reflection can be reduced. Particularly, in the case of normal incidence, $\eta_0$, $\eta_m$ and $\eta_r$ are equivalent to refractive indexes. The refractive index-controlling layer satisfies preferably R<4%, more preferably R<2%, further preferably R<1%. Hereinafter, the reflectivity R represented by the equation (7) may sometimes be referred to as a theoretical reflectivity of the multilayer structure.

In general, a member constituting the convexo-concave portion 62 is a thin film, and it is necessary to calculate the reflectivity as a part of the above multilayer film. However, as described above, by forming the refractive index-controlling layer, the reflectivity can be lowered independent of the thickness of the thin film constituting the convexo-concave portion 62. In the case of the monolayer refractive index-controlling layer, the equation (7) wherein q=1 may be applied, and the effect of the interference may be considered.

Further, in a case where inclined light (wavelength: $\lambda$[nm]) to the normal line direction of the diffractive optical element enters the refractive index-controlling layer, the following condition is preferably satisfied, when light vertically enters an interface between the transparent substrate 61, the refractive index-controlling layer 64 and the convexo-concave portion 62 and/or an interface between the convexo-concave portion 62, the refractive index-controlling layer 65 and the filling portion 63. That is, the transmittance spectrum within a range of from $\lambda-200$ nm to $\lambda+200$ nm has a local minimum value within a range of from $\lambda$ to $\lambda+200$ nm. The minimum value more preferably falls within a range of from $\lambda$ to $\lambda+100$ nm. When inclined line enters, the transmittance spectrum blue-shifts, whereby the decrease of the reflectivity at an interface of the refractive index-controlling layer due to inclined incidence can be suppressed. Further, $\lambda$ corresponds to "designed wavelength".

Further, in the diffractive optical element 60, any of the transparent substrate 61, the convexo-concave portion 62 and the filling portion 63 preferably has a refractive index of at least 1.7, with respect to normal incident light.

Figure 10A:
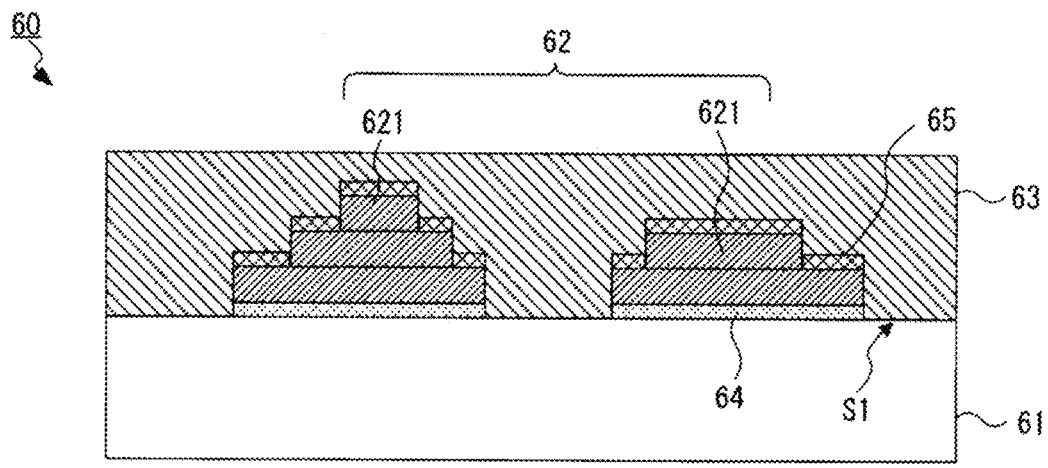
FIGS. 10A and 10B are schematic cross-sectional views illustrating another example of a diffractive optical element 60 in Embodiment 3.
Figure 10B:
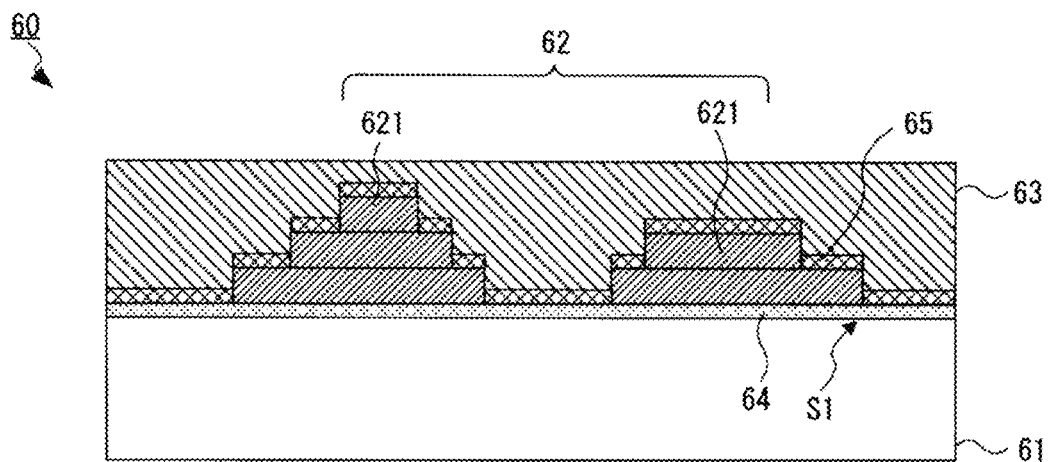

As the diffractive optical element 60, an example of the convexo-concave portion 62 having a first layer 623 is shown as is the case of Embodiment 2. However, the convexo-concave portion 62 may not have the first layer as is the case of the convexo-concave portions 12 in Embodiment 1. In such a case, the filling portion 63 may be or may not be in contact with the transparent substrate 61 (FIGS. 10A and 10B). Further, the refractive index-controlling layers 64 and 65 may be in contact with each other (FIG. 10B).

In all of these Embodiments 1 to 3, the changes of the diffraction efficiency due to attachments on the convexo-concave structure can be prevented, and the diffraction efficiency can be prevented from being lowered due to the reflection at an interface of the convexo-concave structure having the diffraction function. Accordingly, light spots having a predetermined pattern can be stably formed, and a diffractive optical element having a high light utilization efficiency can be obtained.

Embodiment 4

Figure 11A:
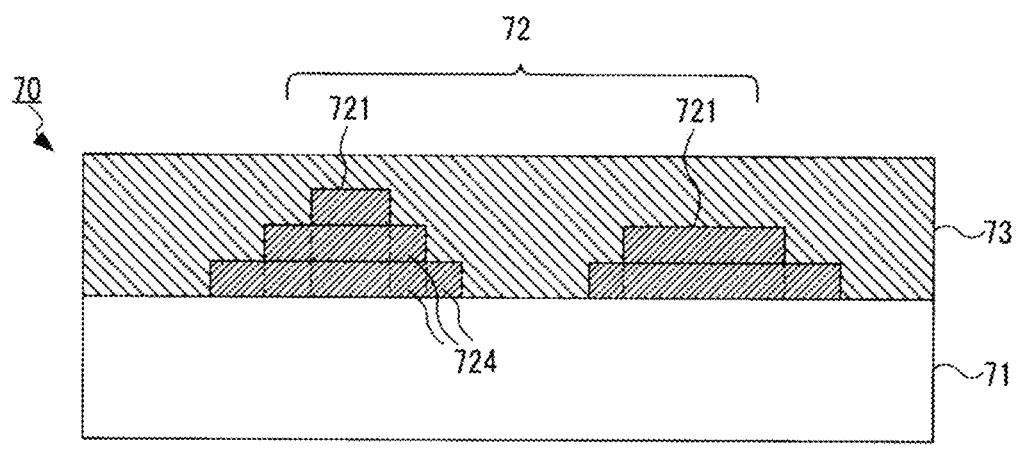
FIGS. 11A and 11B are schematic cross-sectional views of a diffractive optical element 60 in Embodiment 3.

FIG. 11A is a schematic cross-sectional view of a diffractive optical element 70 in Embodiment 4. The diffractive optical element 70 comprises a transparent substrate 71, a convexo-concave portion 72 being in contact with one surface of the transparent substrate 71 and a filling portion 73 to cover the top surface of the convexo-concave portion 72 for planarization.

Figure 11B:
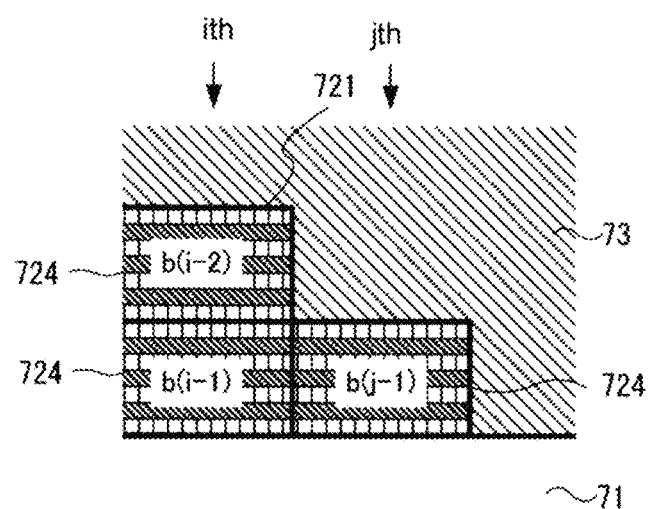

FIG. 11B is an enlarged view of the main part of the FIG. 11A. As illustrated in FIG. 11B, each stage (limited to a stage having height) of the convexo-concave portion 72 has a multilayer structure having a thin layer structure comprising at least 2 layers as the base block (724 in FIG. 11B). Further, the base block is not restricted to one type and may be plural types.

Here, when the base block 724 is a multilayer film comprising q layers each having a refractive index $n_r$ and a thickness $d_r$, the base block 724 is so constituted that the theoretical reflectivity R in the above multilayer structure satisfies R<4%. The base block 724 more preferably satisfies R<2%, further preferably R<1%.

When obtaining the theoretical reflectivity R, $n_0$ is a refractive index of a member (transparent substrate 71 or filling portion 73) constituting an incident side interface as viewed from the convexo-concave portion 72, and $n_m$ is a refractive index of a member (transparent substrate 71 or a filling portion 73) constituting an emergent side interface as viewed from the convexo-concave portion 72.

FIG. 11B is a view illustrating cross-sections of a stage corresponding to ith and a stage corresponding to jth, when each stage of the convex portion 721 is assigned a number for identification. In this example, ith stage has a two stages structure, and jth stage has one stage structure. In such a case, ith stage has a structure having two stacked base blocks 724. Further, jth stage has a structure having one stacked base block 724. In FIG. 11B, "b(i-2)" and "b(i-1)" are exemplified as the base blocks 724 constituting ith stage. Further, "b(j-1)" is exemplified as the base block 724 constituting jth stage. These three base blocks have the same structure. That is, stages of two or more are a repeated structure of the base block 724. In FIGS. 11A and 11B, a boundary between the base blocks 724 is illustrated, however, in a case of base blocks 724 made of the same member, their boundary does not exist. In such a case, a level at the same height of a plane to be the height of each stage of the convex portion 721 may be a theoretical boundary. Further, by obtaining the theoretical reflectivity in accordance with the equation (7), a level to be a thickness so that the theoretical reflectivity will be R<4% may be a theoretical boundary.

Hereinafter, n71, n72 and n73 are refractive indexes of the transparent substrate 71, the convexo-concave portion 72 and the filling portion 73 respectively, with respect to incident light from a normal direction of the surface S1 of the transparent substrate 71. In also this embodiment, n72 and n73 may be average refractive indexes.

Further, FIG. 11A is an example in which the convexo-concave portion 72 has no first layer, similarly to Embodiment 1. However, the present invention is by no means restricted to FIG. 11A, and the convexo-concave portion 72 may have a first layer (not illustrated). In such a case, the convexo-concave portion 72 may have a multilayer structure such that at least one base block 724 is stacked at all stages including the first layer (first stage). That is, each stage having the height among stages in the convexo-concave portion 72 has to have a multilayer structure having at least one base block 724 stacked.

In Embodiment 4, the convex portion 721 of the convexo-concave portion 72 itself has a function as the refractive index-controlling layer controlling the refractive index difference between the transparent substrate 71 and the filling portion 73, whereby reflection at an interface of the convexo-concave structure can be further reduced.

In the above each Embodiment, the wavelength of incident light is not particularly restricted, and for example, infrared ray (specifically, light having a wavelength within a range of from 780 to 1,020 nm) may be used. In a case where light having a longer wavelength than visible light is used, particularly convex and concave tend to be high in order to make the path difference large. Thus, the diffractive optical element in the above each Embodiment is more advantageous.

Further, light can be efficiently diffused by the diffractive optical element in each Embodiment, the diffractive optical element may be used for a projection device such as a projector. Further, for example, the diffractive optical element of each Embodiment may be used as a diffusion element placed between a light source and the predetermined projection plane in the projection device for projecting light from the light source on the predetermined projection plane. Further, the diffractive optical element of each Embodiment may be used for a projection device to emit inspection light within a predetermined projection range, which is included in devices to emit light to an object and to detect scattered light, such as a three-dimensional measuring device or an authorization device. Further, the diffractive optical element of each Embodiment may be used as an intermediate screen (optical element for forming intermediate image) of a projection device such as a head up display. In such a case, in the projection device, the diffractive optical element is, for example, placed between a light source which emits light for forming an intermediate image and a combiner and used as an intermediate screen for projecting light for forming an intermediate image from the light source on the combiner.

In each device, by the effect to lower the reflectivity in the diffractive optical element, the proportion of the light luminous energy projected on a predetermined projection plane is preferably at least 50% to the light luminous energy emitted from a light source.

EXAMPLES

Ex. 1

This example is an example of the diffractive optical element 10 in Embodiment 1 illustrated in FIG. 1. In Ex. 1, the number of stages of the convexo-concave portion 12 is 8 stages (7 stages as the number of stages of the convex portion). Further, a quartz substrate is used as a member of the transparent substrate 11, $TiO_2$ is used as a member of the convexo-concave portion 12, and $SiO_2$ is used as a member of the filling portion 13 respectively. The region where an element and a convexo-concave portion are arranged is 2 $mm^2$, and base units illustrated in FIG. 4C are arranged therein.

First, $TiO_2$ is film-formed on a quartz substrate. Then, $TiO_2$ is processed into a 8 stages-convexo-concave structure by photolithography or the like to form a convexo-concave portion 12 on the transparent substrate 11. Then, $SiO_2$ is film-formed on the convexo-concave structure so as to fill concave portions 122 of the convexo-concave portion 12 and to cover the top surfaces of convex portions 121. After the film-formation, the surface of $SiO_2$ is polished for planarization.

In Table 4, the specific structure of the convexo-concave portion 12 in Ex. 1 is shown. In Table 4, a stage of the height=0 of the convexo-concave portion (for example, first stage) is a region where the convex portion is not formed, that is a region where the transparent substrate is in contact with the filling portion.

TABLE 4

| | | Height of each stage in convexo-concave portion [nm] | | | | | | | |
|---|---|---|---|---|---|---|---|---|---|
| Structure | Material | First stage | Second stage | Third stage | 4th stage | 5th stage | 6th stage | 7th stage | 8th stage |
| Filling portion | SiO$_2$ | — | — | — | — | — | — | — | — |
| Convexo-concave portion | TiO$_2$ | 0 | 172 | 343 | 515 | 686 | 858 | 1029 | 1201 |
| Substrate | Quartz | — | — | — | — | — | — | — | — |

Further, in Ex. 1, the diffractive optical element generates phase difference to form 21 light spots of diffracted light. For designing the base unit of the convexo-concave pattern in the diffractive optical element, calculation was carried out by repeating fast Fourier-transform. In Ex. 1, such base units are arranged at a pitch of 3.6 μm in two axial directions crossing at right angles to form the convexo-concave pattern. The diffraction efficiency distribution at each order of diffracted light obtained by the calculation with respect to incident light is shown in FIG. 7A. Accordingly, in a case where the loss due to reflection or absorption at an incident side interface and in the diffractive optical element does not occur, the forward transmittance in the diffractive optical element of Ex. 1 is 92.3%.

The refractive indexes of the quartz substrate and SiO$_2$ in Ex. 1 are 1.457, and the refractive index of TiO$_2$ is 2.143. Further, the height of one stage of the convex portion is approximately 172 nm so that the path difference will be close to λ/8. Here, λ is 950 nm as the designed wavelength in Ex. 1.

Figure 12:
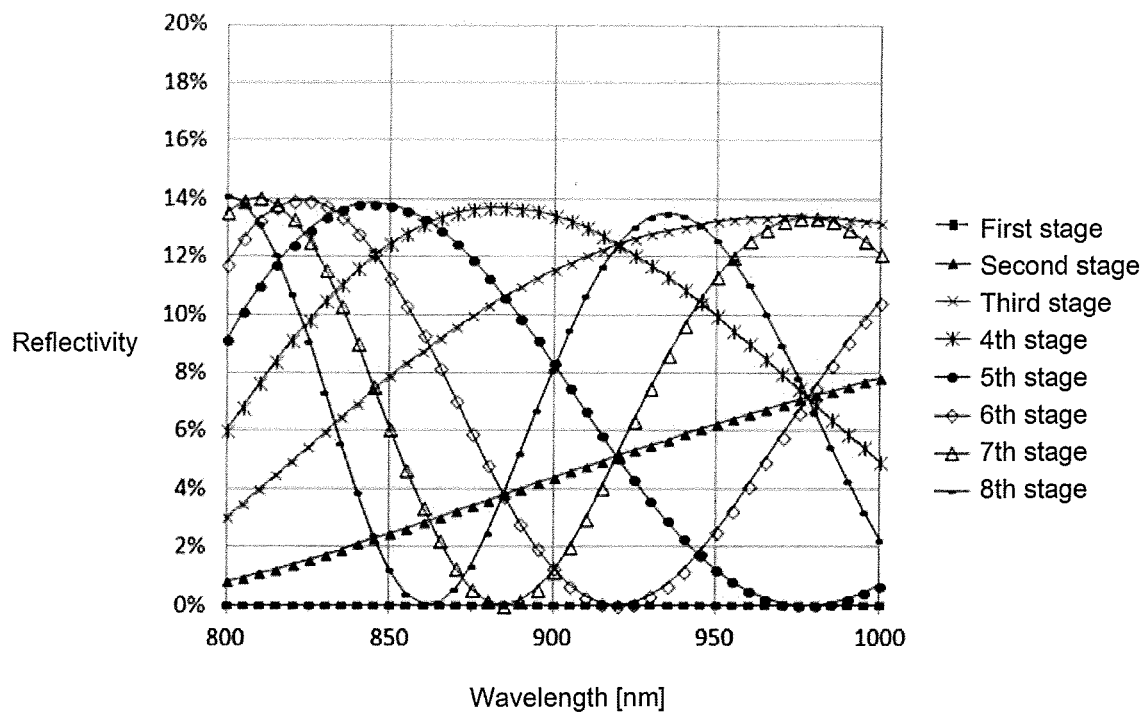
FIG. 12 shows results of calculation of the reflectivity at a wavelength of from 800 to 1,000 nm in Ex. 1.

In FIG. 12, calculation results of reflectivity at a wavelength of from 800 to 1,000 nm with respect to normal incidence of each optical path (more specifically, region corresponding to each stage of the convexo-concave portion) in Ex. 1 are shown. The reflectivity to light in each optical path was calculated by the equation (7). It is evident from FIG. 12 that the diffractive optical element in Ex. 1 has the maximum reflectivity of 12.6% to light having a wavelength of 950 nm, and the average value of the reflectivity to light in each optical path is 7.2%. Accordingly, the forward transmittance in Ex. 1 considering the reflection (reflection by the laminated structure of the transparent substrate, the convexo-concave portion and the filling portion) and the total reflection of high order diffracted light at the emergent side interface, is 92.3%×(100%−7.2%)= 85.6%.

Ex. 2

This example is also an example of the diffractive optical element 10 in Embodiment 1 illustrated in FIG. 1. In Ex. 2 also, the number of stages of the convexo-concave portion 12 is 8 stages. Further, a glass substrate is used as a member of the transparent substrate 11, TiO$_2$ is used as a member of the convexo-concave portion 12, and SiO$_2$ is used as a member of the filling portion 13 respectively.

The method for producing the diffractive optical element in Ex. 2 is the same as in Ex. 1. Further, the specific structure of each stage of the convexo-concave portion is also the same as in Ex. 1. In Table 5, the specific structure of the convexo-concave portion 12 is shown.

TABLE 5

| | | Height of each stage in convexo-concave portion [nm] | | | | | | | |
|---|---|---|---|---|---|---|---|---|---|
| Structure | Material | First stage | Second stage | Third stage | 4th stage | 5th stage | 6th stage | 7th stage | 8th stage |
| Filling portion | SiO$_2$ | — | — | — | — | — | — | — | — |
| Convexo-concave portion | TiO$_2$ | 0 | 172 | 343 | 515 | 686 | 858 | 1029 | 1201 |
| Substrate | Glass | — | — | — | — | — | — | — | — |

The refractive index of the glass substrate in Ex. 2 is 1.513, the refractive index of SiO$_2$ is 1.457, and the refractive index of TiO$_2$ is 2.143. Each refractive index is a value to light having λ=950 nm.

Figure 13:
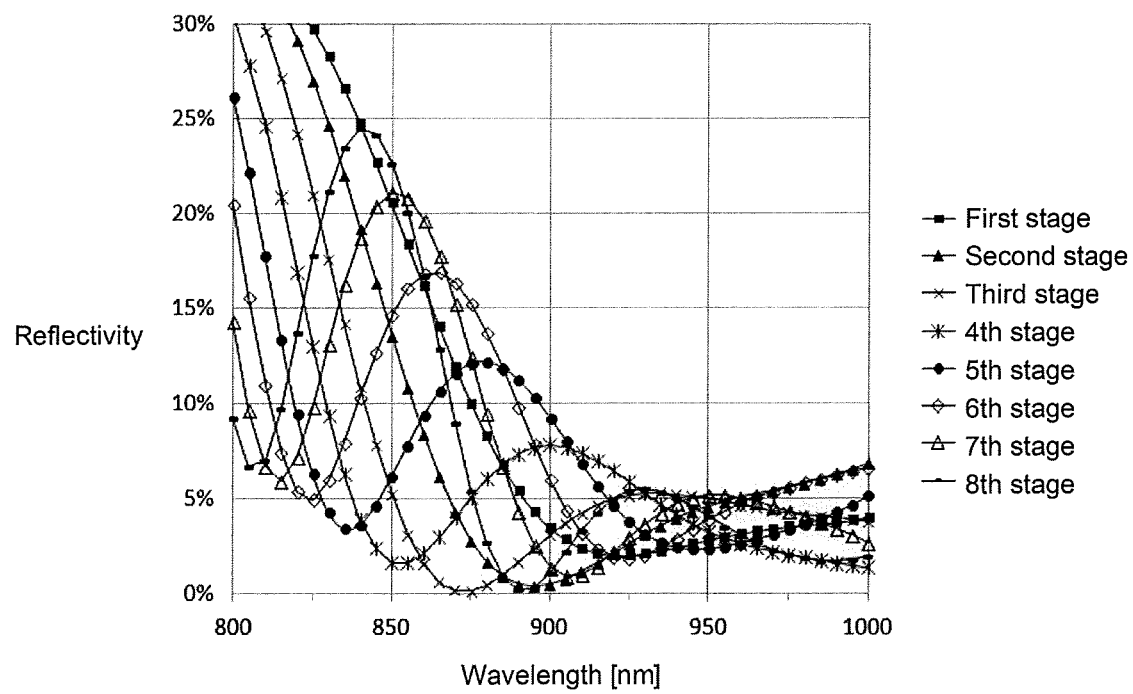
FIG. 13 shows results of calculation of the reflectivity at a wavelength of from 800 to 1,000 nm in Ex. 2.

In FIG. 13, calculation results of reflectivity at a wavelength of from 800 to 1,000 nm with respect to normal incidence of each optical path in Ex. 2 are shown. The calculation method is the same as in Ex. 1. It is evident from FIG. 13 that the diffractive optical element in Ex. 2 has the maximum reflectivity of 11.5% to light having a wavelength of 950 nm, and the average value of the reflectivity to light in each optical path is 6.5%. Accordingly, the forward transmittance in Ex. 2 considering the reflection (reflection by the laminated structure of the transparent substrate, the convexo-concave portion and the filling portion) and the total reflection of high order diffracted light at the emergent side interface, is 86.3%.

Ex. 3

This example is also an example of the diffractive optical element 10 in Embodiment 1 illustrated in FIG. 1. In also Ex. 3, the number of stages of the convexo-concave portion 12 is 8 stages. Further, a glass substrate is used as a member of the transparent substrate 11, ZnO$_2$ is used as a member of the convexo-concave portion 12, and SiO$_2$ is used as a member of the filling portion 13 respectively.

The method for producing the diffractive optical element in Ex. 3 is the same as in Ex. 1. The specific structure of each stage in the convexo-concave portion 12 of Ex. 3 is as shown in Table 6. The others including the designed wavelength λ are the same as in Ex. 1.

TABLE 6

| | | Height of each stage in convexo-concave portion [nm] | | | | | | | |
|---|---|---|---|---|---|---|---|---|---|
| Structure | Material | First stage | Second stage | Third stage | 4th stage | 5th stage | 6th stage | 7th stage | 8th stage |
| Filling portion | SiO$_2$ | — | — | — | — | — | — | — | — |
| Convexo-concave portion | ZnO$_2$ | 0 | 262 | 524 | 786 | 1049 | 1311 | 1573 | 1835 |
| Substrate | Glass | — | — | — | — | — | — | — | — |

The refractive index of the glass substrate in Ex. 3 is 1.513, the refractive index of SiO$_2$ is 1.457, and the refractive index of ZnO$_2$ is 1.905. Further, in Ex. 3, the height of one stage of the convex portion is approximately 262 nm so that the optical path length difference will be close to λ/8.

Figure 14:
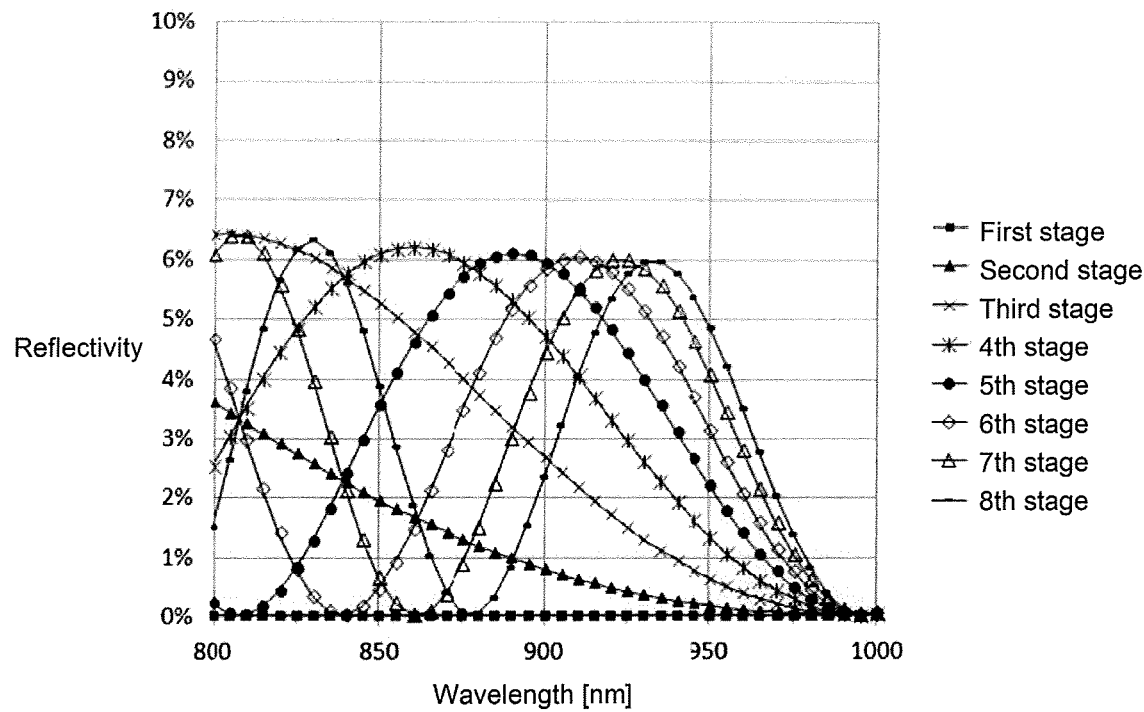
FIG. 14 shows results of calculation of the reflectivity at a wavelength of from 800 to 1,000 nm in Ex. 3.

FIG. 14 shows calculation results of the reflectivity at a wavelength of from 800 to 1,000 nm with respect to normal incidence of each optical path in Ex. 3. The calculation method is the same as Ex. 1. It is evident from FIG. 14 that the maximum reflectivity of the diffractive optical element in Ex. 3 to light having a wavelength of 950 nm is 4.9%, and the average value of the reflectivity to light in each optical path is 2.1%. Accordingly, the forward transmittance considering the reflection (reflection by the lamination structure of the transparent substrate, convexo-concave portion and the filling portion) and the total reflection of high order diffracted light at the emergent side interface in Ex. 3, is 90.3%.

Ex. 4

This example is an example of the diffractive optical element 50 in Embodiment 2 illustrated in FIG. 8. In Ex. 4, the number of stages of the convexo-concave portion 52 including a first layer 523 is 8 stages. Further, a glass substrate is used as a member of the transparent substrate 51, ZnO$_2$ is used as a member of the convexo-concave portions 52, and SiO$_2$ is used as a member of the filling portion 13 respectively.

First, ZnO$_2$ is film-formed on a glass substrate. Then, the film-formed ZnO$_2$ is processed into a 8 stages-convexo-concave structure by photolithography or the like to form on a transparent substrate 51 a convexo-concave portion 52 which covers the surface of the transparent substrate 51. Then, SiO$_2$ is film-formed on the convexo-concave structure so as to fill concave portions 522 of the convexo-concave portion 52 and to cover the top surfaces of convex portions 521. After the film-formation, the surface of SiO$_2$ is polished for planarization.

In Table 4, the specific structure of the convexo-concave portion 52 in Ex. 4 is shown. The others are the same as in Ex. 1.

TABLE 7

| | | | Height of each stage in convexo-concave portion [nm] | | | | | | | |
|---|---|---|---|---|---|---|---|---|---|---|
| Structure | | Material | First stage | Second stage | Third stage | 4th stage | 5th stage | 6th stage | 7th stage | 8th stage |
| Filling portion | | SiO$_2$ | — | — | — | — | — | — | — | — |
| Convexo-concave portion | Convex portion | ZnO$_2$ | 0 | 262 | 524 | 786 | 1049 | 1311 | 1573 | 1835 |
| | First layer | ZnO$_2$ | 1835 | 1835 | 1835 | 1835 | 1835 | 1835 | 1835 | 1835 |
| Substrate | | Glass | — | — | — | — | — | — | — | — |
| Optical path length | | | 3.68 | 4.21 | 4.73 | 5.26 | 5.78 | 6.31 | 6.83 | 7.36 |

The refractive index of the glass substrate in Ex. 4 is 1.513, the refractive index of SiO$_2$ is 1.457, and the refractive index of ZnO$_2$ is 1.905. Further, in also Ex. 4, the height of one stage of the convex portion is approximately 262 nm so that the optical path length difference will be close to λ/8.

Figure 15:
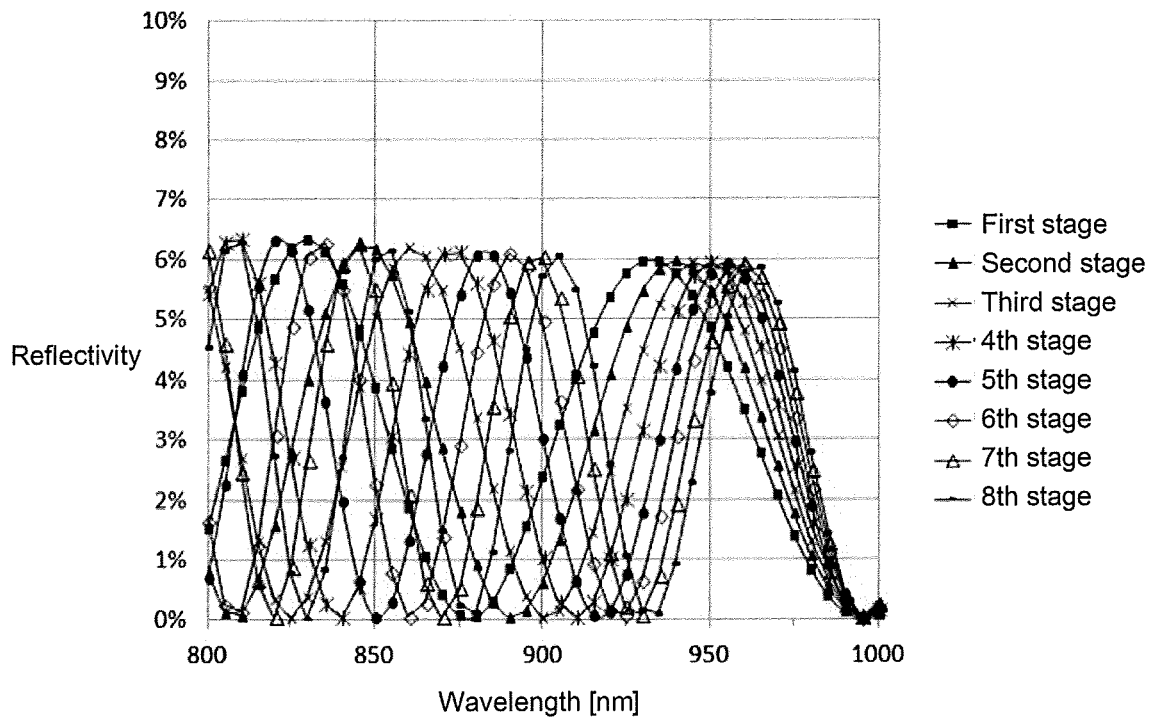
FIG. 15 shows results of calculation of the reflectivity at a wavelength of from 800 to 1,000 nm in Ex. 4.

FIG. 15 shows calculation results of the reflectivity at a wavelength of from 800 to 1,000 nm with respect to normal incidence of each optical path in Ex. 4. The calculation method is the same as Ex. 1. It is evident from FIG. 15 that the maximum reflectivity of the diffractive optical element in Ex. 4 to light having a wavelength of 950 nm is 5.9%, and the average value of the reflectivity to light in each optical path is 5.2%. Accordingly, the forward transmittance considering the reflection (reflection by the lamination structure of the transparent substrate, convexo-concave portion and the filling portion) and the total reflection of high order diffracted light at the emergent side interface in Ex. 4, is 87.5%.

Ex. 5

This example is also an example of the diffractive optical element 50 in Embodiment 2 illustrated in FIG. 8. In also Ex. 5, the number of stages of the convexo-concave portion 52 including a first layer 523 is 8 stages. Further, a glass substrate is used as a member of the transparent substrate 51, ZnO$_2$ is used as a member of the convexo-concave portion 52, and SiO$_2$ is used as a member of the filling portion 53 respectively.

The method for producing the diffractive optical element in Ex. 5 is the same as in Ex. 4. The specific structure of each stage in the convexo-concave portion 52 of Ex. 5 is as shown in Table 8. Here, the thickness of the first layer 523 is different from that in Ex. 4.

TABLE 8

| Structure | | Material | Height of each stage in convexo-concave portion [nm] | | | | | | | |
|---|---|---|---|---|---|---|---|---|---|---|
| | | | First stage | Second stage | Third stage | 4th stage | 5th stage | 6th stage | 7th stage | 8th stage |
| Filling portion | | $SiO_2$ | — | — | — | — | — | — | — | — |
| Convexo-concave portion | Convex portion | $ZnO_2$ | 0 | 262 | 524 | 786 | 1049 | 1311 | 1573 | 1835 |
| | First layer | $ZnO_2$ | 210 | 210 | 210 | 210 | 210 | 210 | 210 | 210 |
| Substrate | | Glass | — | — | — | — | — | — | — | — |
| Optical path length | | | 0.42 | 0.95 | 1.47 | 2.00 | 2.52 | 3.05 | 3.58 | 4.10 |

The refractive index of the glass substrate in Ex. 5 is 1.513, the refractive index of $SiO_2$ is 1.457, and the refractive index of $ZnO_2$ is 1.905. Further, in also Ex. 5, the height of one stage of the convex portion is approximately 262 nm so that the optical path length difference will be close to $\lambda/8$.

Figure 16:
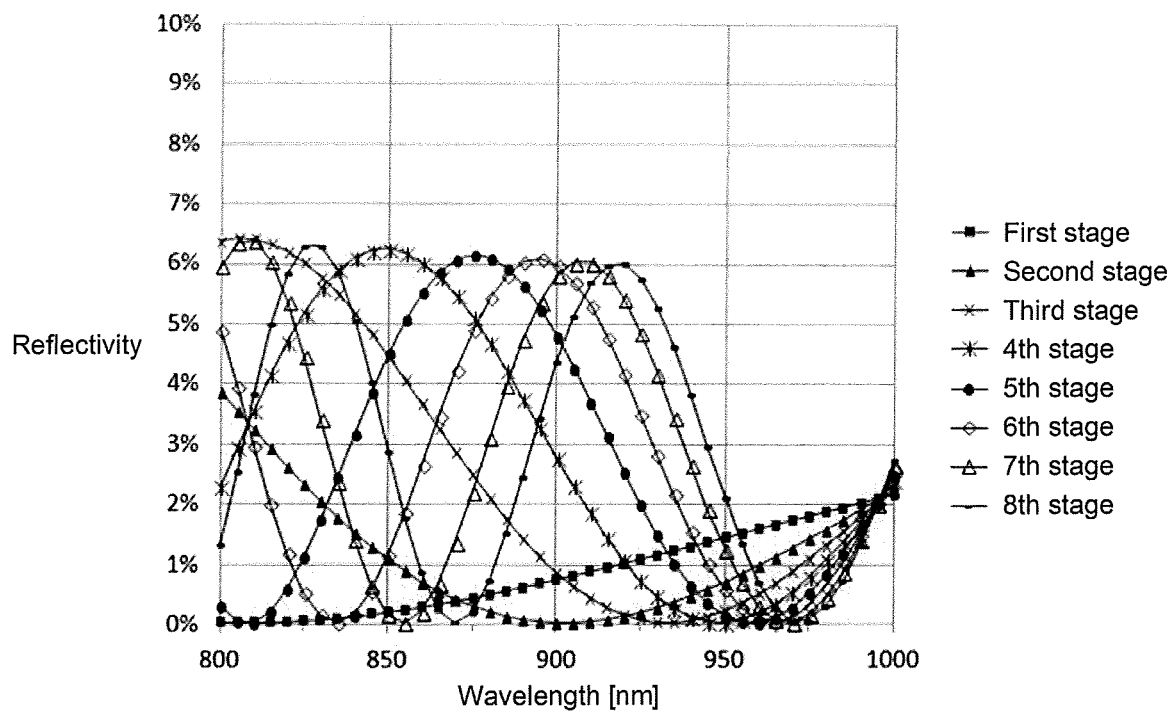
FIG. 16 shows results of calculation of the reflectivity at a wavelength of from 800 to 1,000 nm in Ex. 5.

FIG. 16 shows calculation results of the reflectivity at a wavelength of from 800 to 1,000 nm with respect to normal incidence of each optical path in Ex. 5. The calculation method is the same as Ex. 1. It is evident from FIG. 16 that the maximum reflectivity of the diffractive optical element in Ex. 5 to light having a wavelength of 950 nm is 2.1%, and the average value of the reflectivity to light in each optical path is 0.8%. Accordingly, the forward transmittance considering the reflection (reflection by the lamination structure of the transparent substrate, convexo-concave portion and the filling portion) and the total reflection of high order diffracted light at the emergent side interface in Ex. 5, is 91.6%. Here, as shown in Table 8, the optical path length of each optical path at each stage of the convexo-concave portion is a value close to the integral multiple of half wavelength.

Ex. 6

This example is an example of the diffractive optical element 60 in Embodiment 3 illustrated in FIG. 9. In Ex. 6, the refractive index-controlling layer 65 is not formed. Further, the number of stages of the convexo-concave portion 62 including a first layer 623 is 8 stages. Further, a quartz substrate is used as a member of the transparent substrate 61, $TiO_2$ is used as a member of the convexo-concave portions 62, and $SiO_2$ is used as a member of the filling portion 63 respectively. Further, a multilayer film of $TiO_2$ and $SiO_2$ is used as a member of the refractive index-controlling layer 64.

First, a multilayer film of $TiO_2$ and $SiO_2$ to be the refractive index-controlling layer 64 and $TiO_2$ to be the convexo-concave portion 62 are film-formed on the quart substrate. Then, the upper layer of the film-formed $TiO_2$ is processed into a 8-stages convexo-concave structure by photolithography or the like to form on a transparent substrate 61, the refractive index-controlling layer 64 and the convexo-concave portion 62 which covers a surface of the refractive index-controlling layer 64. Then, $SiO_2$ is film-formed on the convexo-concave structure so that the concave portions 622 of the convexo-concave portion 62 will be filled, and the top surfaces of the convex portions 621 will be covered. After the film-formation, a surface of $SiO_2$ is polished for planarization.

Table 9 shows a specific structure of the convexo-concave portion 62 and 64 in Ex. 6.

TABLE 9

| Structure | | Material | Height of each stage in convexo-concave portion [nm] | | | | | | | |
|---|---|---|---|---|---|---|---|---|---|---|
| | | | First stage | Second stage | Third stage | 4th stage | 5th stage | 6th stage | 7th stage | 8th stage |
| Filling portion | | $SiO_2$ | — | — | — | — | — | — | — | — |
| Convexo-concave portion | Convex portion | $TiO_2$ | 0 | 172 | 343 | 515 | 686 | 858 | 1029 | 1201 |
| | First layer | $TiO_2$ | 250 | 250 | 250 | 250 | 250 | 250 | 250 | 250 |
| Refractive index-controlling layer | | $SiO_2$ | 12 | 12 | 12 | 12 | 12 | 12 | 12 | 12 |
| | | $TiO_2$ | 78 | 78 | 78 | 78 | 78 | 78 | 78 | 78 |
| | | $SiO_2$ | 281 | 281 | 281 | 281 | 281 | 281 | 281 | 281 |
| | | $TiO_2$ | 194 | 194 | 194 | 194 | 194 | 194 | 194 | 194 |
| | | $SiO_2$ | 454 | 454 | 454 | 454 | 454 | 454 | 454 | 454 |
| | | $TiO_2$ | 232 | 232 | 232 | 232 | 232 | 232 | 232 | 232 |
| Substrate | | Quartz | — | — | — | — | — | — | — | — |

Further, in Ex. 6, the diffractive optical element generates phase difference to form 21 light spots of diffracted light. For arranging the base unit of the convexo-concave pattern in the diffractive optical element, calculation was carried out by repeating fast Fourier-transform. In Ex. 6, such base units are arranged to form the convexo-concave pattern at a pitch of 6.6 μm in two axial directions crossing at right angles crossing. The diffraction efficiency distribution at each order of diffracted light obtained by the calculation with respect to incident light is shown in FIG. 7B. Accordingly, in a case where the loss due to reflection or absorption at an incident side interface and in the diffractive optical element does not occur, the forward transmittance in the diffractive optical element of Ex. 6 is 95.4%.

The refractive indexes of the quartz substrate and $SiO_2$ in Ex. 6 are 1.457, and the refractive index of $TiO_2$ is 2.143. Further, the height of one stage of the convex portion is approximately 172 nm so that the path difference will be close to $\lambda/8$. Here, $\lambda$ is 950 nm. The transparent substrate, the members of the convexo-concave portion and the filling portion and the height of the convex portion of the convexo-concave portion are the same as those in Ex. 1. Further, the refractive index-controlling layer 64 comprising a multi-layer film of $SiO_2$ and $TiO_2$ is constructed so that the theoretical reflectivity of the multilayer structure will be R<4%.

Figure 17:
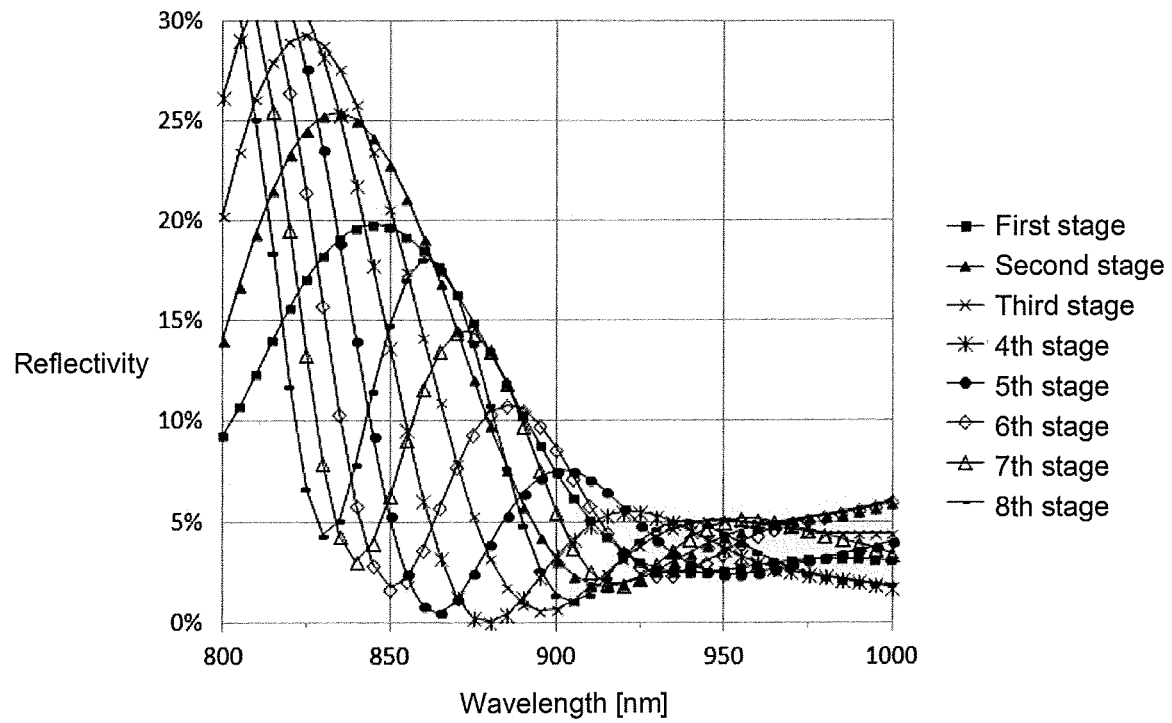
FIG. 17 shows results of calculation of the reflectivity at a wavelength of from 800 to 1,000 nm in Ex. 6.

In FIG. 17, calculation results of the reflectivity at a wavelength of from 800 to 1,000 nm with respect to normal incidence of each optical path in Ex. 6 are shown. The calculation method is the same as in Ex. 1. It is evident from FIG. 17 that the diffractive optical element in Ex. 6 has a maximum reflectivity of 5.0% to light having a wavelength of 950 nm, and the average value of the reflectivity to light in each optical path is 3.8%. Accordingly, the forward transmittance in Ex. 6 considering the reflection (reflection by the laminated structure of the transparent substrate, the refractive index-controlling layer (64), the convexo-concave portion and the filling portion) and the total reflection of high order diffracted light at the emergent side interface, is 95.4%×(100%−3.8%)=91.8%.

Ex. 7

This example is also an example of the diffractive optical element 60 in Embodiment 3 illustrated in FIG. 9. In Ex. 7, the refractive index-controlling layer 64 is not formed. Further, the number of stages of the convexo-concave portion 12 including a first layer 623 is 8 stages. Further, a quartz substrate is used as a member of the transparent substrate 61, $TiO_2$ is used as a member of the convexo-concave portion 62, and $SiO_2$ is used as a member of the filling portion 63 respectively. Further, a mixture of $ZrO_2$ and $Al_2O_3$ is used as a member of the refractive index-controlling layer 65.

First, $TiO_2$ to be the convexo-concave portion 62 is film-formed on a quartz substrate. Then, the upper layer of the film-formed $TiO_2$ is processed into a 8 stages-convexo-concave structure by photolithography or the like to form on a transparent substrate 61, the convexo-concave portion 62 which covers a surface of the transparent substrate 61. Then, the refractive index-controlling layer 65 made of a mixture of $ZrO_2$ and $Al_2O_3$ is film-formed on the convexo-concave portion 62. Then, $SiO_2$ is film-formed on the convexo-concave structure having the refractive index-controlling layer 65 formed thereon so that the concave portion 622 of the convexo-concave portion 62 will be filled, and the top surfaces of the convex portions 621 (more specifically the refractive index-controlling layer 65 formed on the convex portions 621) will be covered, in a state where the refractive index-controlling layer 65 is present. After the film-formation, a surface of $SiO_2$ is polished for planarization.

Table 10 shows a specific structure of the convexo-concave portion 62 and the refractive index-controlling layer 65 in Ex. 7. The others are the same as in Ex. 6.

TABLE 10

| | | Height of each stage in convexo-concave portion [nm] | | | | | | | |
|---|---|---|---|---|---|---|---|---|---|
| Structure | Material | First stage | Second stage | Third stage | 4th stage | 5th stage | 6th stage | 7th stage | 8th stage |
| Filling portion | $SiO_2$ | — | — | — | — | — | — | — | — |
| Refractive index-controlling layer | $ZrO_2$ + $Al_2O_3$ | 135 | 135 | 135 | 135 | 135 | 135 | 135 | 135 |
| Convexo-concave portion Convex portion | $TiO_2$ | 0 | 172 | 343 | 515 | 686 | 858 | 1029 | 1201 |
| Convexo-concave portion First layer | $TiO_2$ | 200 | 200 | 200 | 200 | 200 | 200 | 200 | 200 |
| Substrate | Quartz | — | — | — | — | — | — | — | — |

The refractive indexes of the quartz substrate and $SiO_2$ in Ex. 7 are 1.457, and the refractive index of $TiO_2$ is 2.143. Further, the height of one stage of the convex portion is approximately 172 nm so that the path difference will be close to $\lambda/8$. Here, $\lambda$ is 950 nm. The transparent substrate, the members of the convexo-concave portion and the filling portion and the height of the convex portion of the convexo-concave portion in Ex. 7 are also the same as those in Ex. 1. Further, the refractive index-controlling layer 65 made of a mixture of $ZrO_2$ and $Al_2O_3$ is constituted so that the first refractive index relation equation (the above equation (6)) regarding the monolayer thin film will be satisfied.

Figure 18:
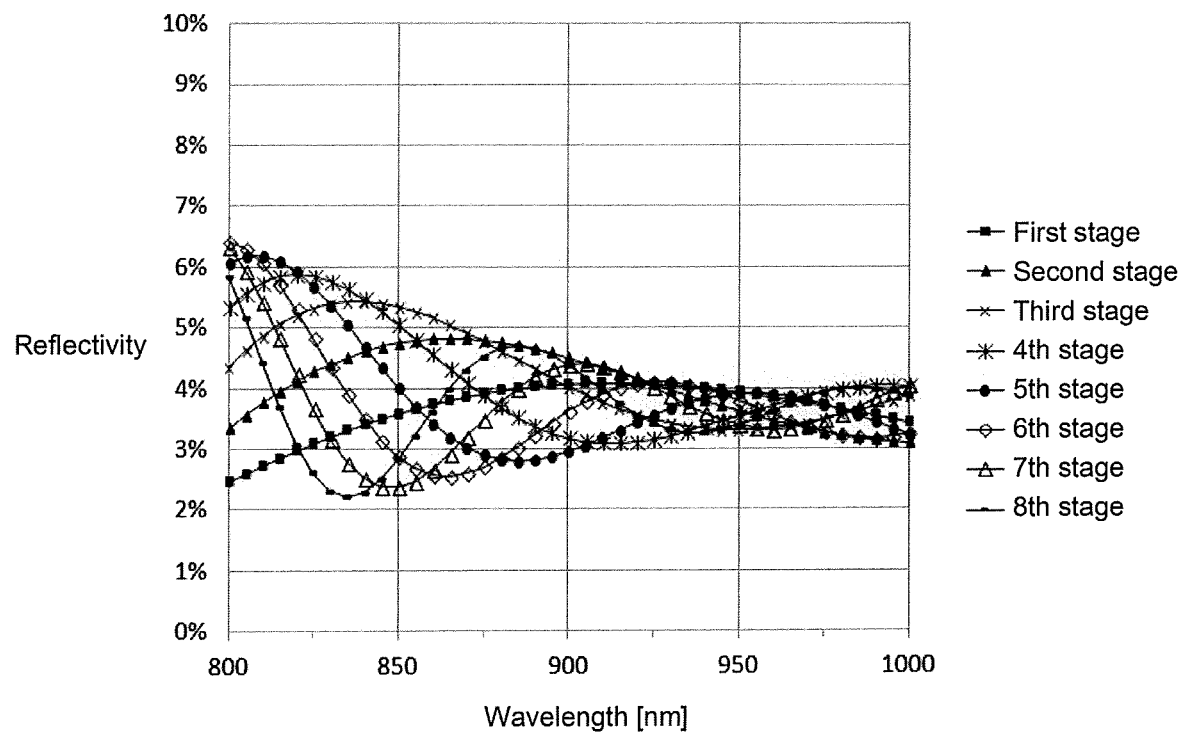
FIG. 18 shows results of calculation of the reflectivity at a wavelength of from 800 to 1,000 nm in Ex. 7.

In FIG. 18, calculation results of the reflectivity at a wavelength of from 800 to 1,000 nm with respect to normal incidence of each optical path in Ex. 7 are shown. The calculation method is the same as in Ex. 1. It is evident from FIG. 18 that the diffractive optical element in Ex. 7 has a maximum reflectivity of 3.9% to light having a wavelength of 950 nm, and the average value of the reflectivity to light in each optical path is 3.6%. Accordingly, the forward transmittance in Ex. 7 considering the reflection (reflection by the laminated structure of the transparent substrate, the convexo-concave portion, the refractive index-controlling layer (65) and the filling portion) and the total reflection of high order diffracted light at the emergent side interface, is 95.4%×(100%−3.6%)=91.9%.

Ex. 8

This example is also an example of the diffractive optical element 60 in Embodiment 3 illustrated in FIG. 9. In Ex. 8, the number of stages of the convexo-concave portion 62 including a first layer 623 is 8 stages. Further, a quartz substrate is used as a member of the transparent substrate 61, $TiO_2$ is used as a member of the convexo-concave portion 62, and $SiO_2$ is used as a member of the filling portion 63 respectively. Further, a multilayer film of $TiO_2$ and $SiO_2$ is used as a member of the refractive index-controlling layer 65, and a mixture of $ZrO_2$ and $Al_2O_3$ is used as a member of the refractive index-controlling layer 64 respectively.

First, a multilayer film of $TiO_2$ and $SiO_2$ to be the refractive index-controlling layer 64 and $TiO_2$ to be the convexo-concave portion 62 are film-formed on the quartz substrate. Then, the upper layer of the film-formed $TiO_2$ is processed into a 8-stages convexo-concave structure by photolithography or the like to form on a transparent substrate 61, the refractive index-controlling layer 64, and the convexo-concave portion 62 which covers a surface of the refractive index-controlling layer 64. Then, the refractive index-controlling layer 65 made of a mixture of $ZrO_2$ and $Al_2O_3$ is film-formed on the convexo-concave portion 62. Then, $SiO_2$ is film-formed on the convexo-concave structure having the refractive index-controlling layer 65 formed thereon so that the concave portions 622 of the convexo-concave portion 62 will be filled, and the top surfaces of the convex portions 621 (more specifically the refractive index-controlling layer 65 formed on the convex portions 621) will be covered in a state where the refractive index-controlling layer 65 is present. After the film-formation, a surface of $SiO_2$ is polished for planarization.

Table 11 shows a specific structure of the convexo-concave portion 62 and the refractive index-controlling layers 64 and 65 in Ex. 8. The others are the same as in Ex. 6.

incidence of each optical path in Ex. 8 are shown. The calculation method is the same as in Ex. 1. It is evident from FIG. 19 that the diffractive optical element in Ex. 8 has a maximum reflectivity of 0.2% to light having a wavelength of 950 nm, and the average value of the reflectivity to light in each optical path is 0.1%. Accordingly, the forward transmittance in Ex. 8 considering the reflection (reflection by the laminated structure of the transparent substrate, the refractive index-controlling layer (64), the convexo-concave portion, the refractive index-controlling layer (65) and the filling portion) and the total reflection of high order diffracted light at the emergent side interface, is 95.3%.

Ex. 9

This example is an example of the diffractive optical element 70 in Embodiment 4 illustrated in FIG. 11A. In Ex. 9, the number of stages of the convexo-concave portion 72 is 8 stages. Further, a quartz substrate is used as a member of the transparent substrate 71, a multilayer film made of $TiO_2$ and $SiO_2$ is used as a member of the convexo-concave portion 72, and $SiO_2$ is used as a member of the filling portion 73 respectively.

The convexo-concave portion 72 in Ex. 9 has a multilayer film consisting of three layers formed by laminating $TiO_2$, $SiO_2$ and $TiO_2$ with a film thickness of 65 nm, 29 nm and 93 nm respectively in this order from the substrate side as the base blocks.

TABLE 11

| | | Height of each stage in convexo-concave portion [nm] | | | | | | | |
|---|---|---|---|---|---|---|---|---|---|
| Structure | Material | First stage | Second stage | Third stage | 4th stage | 5th stage | 6th stage | 7th stage | 8th stage |
| Filling portion | $SiO_2$ | — | — | — | — | — | — | — | — |
| Refractive index-controlling layer | $ZrO_2$ + $Al_2O_3$ | 135 | 135 | 135 | 135 | 135 | 135 | 135 | 135 |
| Convexo-concave portion | Convex | $TiO_2$ | 0 | 172 | 343 | 515 | 686 | 858 | 1029 | 1201 |
| | First layer | $TiO_2$ | 200 | 200 | 200 | 200 | 200 | 200 | 200 | 200 |
| Refractive index-controlling layer | $SiO_2$ | 12 | 12 | 12 | 12 | 12 | 12 | 12 | 12 |
| | $TiO_2$ | 78 | 78 | 78 | 78 | 78 | 78 | 78 | 78 |
| | $SiO_2$ | 281 | 281 | 281 | 281 | 281 | 281 | 281 | 281 |
| | $TiO_2$ | 194 | 194 | 194 | 194 | 194 | 194 | 194 | 194 |
| | $SiO_2$ | 454 | 454 | 454 | 454 | 454 | 454 | 454 | 454 |
| | $TiO_2$ | 232 | 232 | 232 | 232 | 232 | 232 | 232 | 232 |
| Substrate | Quartz | — | — | — | — | — | — | — | — |

The refractive indexes of the quartz substrate and $SiO_2$ in Ex. 8 are 1.457, the refractive index of $TiO_2$ is 2.143, and the refractive index of the mixture of $ZrO_2$ and $Al_2O_3$ is 1.78. Further, the height of one stage of the convex portion is approximately 172 nm so that the path difference will be close to $\lambda/8$. Here, $\lambda$ is 950 nm. The transparent substrate, the members of the convexo-concave portion and the filling portion and the height of the convex portion of the convexo-concave portion in Ex. 8 are the same as those in Ex. 1. Further, the diffractive optical element has both the refractive index-controlling layer 64 in Ex. 6 and the refractive index-controlling layer 65 in Ex. 7.

Figure 19:
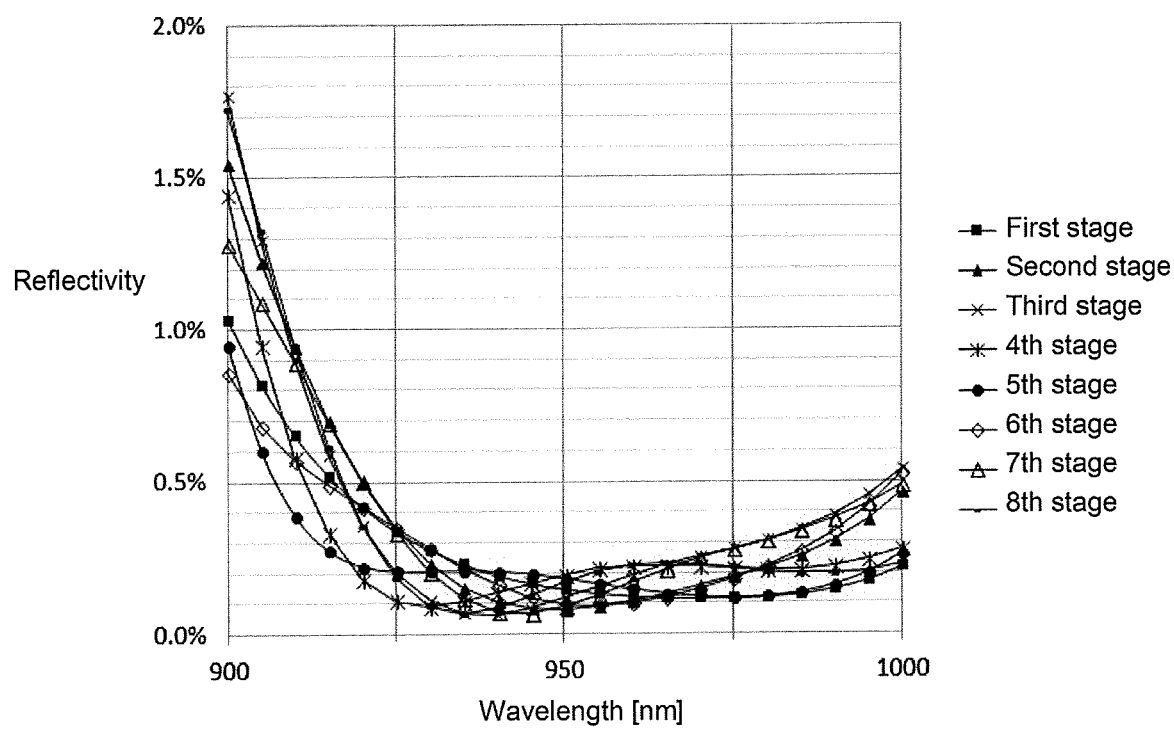
FIG. 19 shows results of calculation of the reflectivity at a wavelength of from 900 to 1,000 nm in Ex. 8.

In FIG. 19, calculation results of the reflectivity at a wavelength of from 900 to 1,000 nm with respect to normal First, a multilayer film made of $TiO_2$ and $SiO_2$ to be the convexo-concave portion 72 is film-formed on the quartz substrate. Here, the film-formation is carried out so as to be the highest stage. Then, the multilayer film is processed into a 7-stages convexo-concave structure by photolithography or the like to form on a transparent substrate 71, the convexo-concave portion 72. Then, $SiO_2$ is film-formed on the convexo-concave structure so that the concave portions 722 of the convexo-concave portion 72 will be filled, and the top surfaces of the convex portion 721 will be covered. After the film-formation, a surface of $SiO_2$ is polished for planarization.

Table 12 shows a specific structure of the convexo-concave portion 72 in Ex. 9. The others are the same as in Ex. 6.

TABLE 12

| Structure | Material | Height of each stage in convexo-concave portion [nm] | | | | | | | |
|---|---|---|---|---|---|---|---|---|---|
| | | First stage | Second stage | Third stage | 4th stage | 5th stage | 6th stage | 7th stage | 8th stage |
| Filling portion | SiO2 | | | | | | | | |
| Convexo-concave portion | TiO₂ | | | | | | | | 82 |
| | SiO₂ | | | | | | | | 36 |
| | TiO₂ | | | | | | | | 82 | 172 |
| | SiO₂ | | | | | | | 36 | 36 |
| | TiO₂ | | | | | | 82 | 172 | 172 |
| | SiO₂ | | | | | | 36 | 36 | 36 |
| | TiO₂ | | | | | 82 | 172 | 172 | 172 |
| | SiO₂ | | | | | 36 | 36 | 36 | 36 |
| | TiO₂ | | | | 82 | 172 | 172 | 172 | 172 |
| | SiO₂ | | | | 36 | 36 | 36 | 36 | 36 |
| | TiO₂ | | | 82 | 172 | 172 | 172 | 172 | 172 |
| | SiO₂ | | | 36 | 36 | 36 | 36 | 36 | 36 |
| | TiO₂ | | 82 | 172 | 172 | 172 | 172 | 172 | 172 |
| | SiO₂ | | 36 | 36 | 36 | 36 | 36 | 36 | 36 |
| | TiO₂ | 0 | 89 | 89 | 89 | 89 | 89 | 89 | 89 |
| Substrate | Quartz | | | | | | | | |

Here, in Table 12, TiO₂(89), SiO₂(36), and TiO₂(82) of the second stage form a base block. Of the third stage, from bottom to top, TiO₂(89), SiO₂(36), and TiO₂(172) form a base block: TiO₂(172), SiO₂(36), and TiO₂(82) form a base block. Of the 4th stage, from bottom to top, TiO₂(89), SiO₂(36), and TiO₂(172) form a base block; TiO₂(172), SiO₂(36), and TiO₂(172) form a base block; TiO₂(172), SiO₂(36), and TiO₂(82) form a base block. Of the 5th stage, from bottom to top, TiO₂(89), SiO₂(36), and TiO₂(172) form a base block; TiO₂(172), SiO₂(36), and TiO₂(172) form a base block; TiO₂(172), SiO₂(36), and TiO₂(172) form a base block; TiO₂(172), SiO₂(36), and TiO₂(82) form a base block. Of the 6th stage, from bottom to top, TiO₂(89), SiO₂(36), and TiO₂(172) form a base block; TiO₂(172), SiO₂(36), and TiO₂(172) form a base block; TiO₂(172), SiO₂(36), and TiO₂(172) form a base block; TiO₂(172), SiO₂(36), and TiO₂(172) form a base block; TiO₂(172), SiO₂(36), and TiO₂(82) form a base block. Of the 7th stage, from bottom to top, TiO₂(89), SiO₂(36), and TiO₂(172) form a base block; TiO₂(172), SiO₂(36), and TiO₂(172) form a base block; TiO₂(172), SiO₂(36), and TiO₂(172) form a base block; TiO₂(172), SiO₂(36), and TiO₂(172) form a base block; TiO₂(172) form a base block; TiO₂(172), SiO₂(36), and TiO₂(82) form a base block. Of the 8th stage, from bottom to top TiO₂(89), SiO₂(36), and TiO₂(172) form a base block; TiO₂(172), SiO₂(36), and TiO₂(172) form a base block; TiO₂(172), SiO₂(36), and TiO₂(172), form a base block; TiO₂(172), SiO₂(36), and TiO₂(172) form a base block; TiO₂(172), SiO₂(36), and TiO₂(172) form a base block; TiO₂(172), SiO₂(36), and TiO₂(172) form a base block; TiO₂(172), SiO₂(36), and TiO₂(82) form a base block. The refractive indexes of the quartz substrate and SiO₂ in Ex. 9 are 1.457, and the refractive index of TiO₂ is 2.143. Further, the height of one stage of the convex portion is approximately 172 nm so that the path difference will be close to $\lambda/8$. Here, $\lambda$ is 950 nm. so that the path difference will be close to $\lambda/8$. Here, $\lambda$ is 950 nm.

Figure 20:
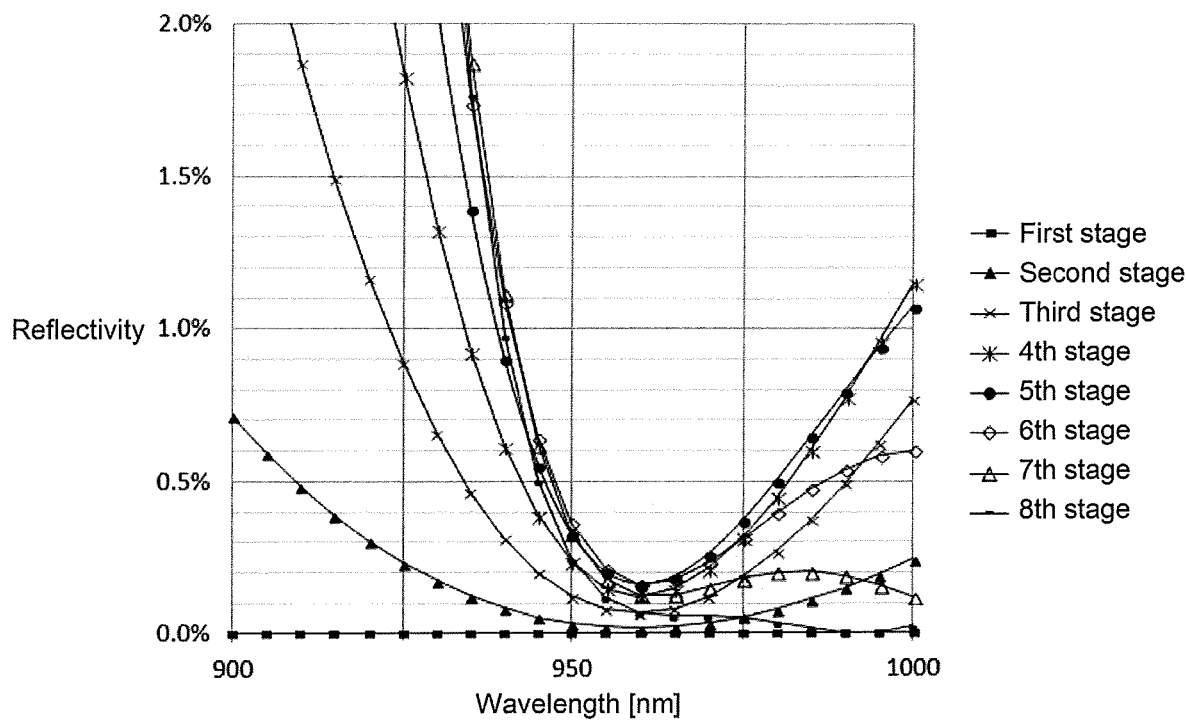
FIG. 20 shows results of calculation of the reflectivity at a wavelength of from 900 to 1,000 nm in Ex. 9.

In FIG. 20, calculation results of the reflectivity at a wavelength of from 900 to 1,000 nm with respect to normal incidence of each optical path in Ex. 9 are shown. The calculation is carried out by means of the equation (7). It is evident from FIG. 20 that the diffractive optical element in Ex. 9 has a maximum reflectivity of 0.4% to light having a wavelength of 950 nm, and the average value of the reflectivity to light in each optical path is 0.2%. Accordingly, the forward transmittance in Ex. 9 considering the total reflection of high order diffracted light at the emergent side interface and the reflection by the laminated structure of the transparent substrate, the convexo-concave portion and the filling portion, is 95.4%×(100%−0.2%)=95.2%. Under assumption that the total reflection of high order diffracted light and the absorption do not occur, the forward transmittance in Ex. 9 is at least 99%.

Ex. 10

This example is an example of the diffractive optical element 10 in Embodiment 1 illustrated in FIG. 1. In Ex. 10, the number of stages of the convexo-concave portion 12 is 2 stages, that is a binary convexo-concave structure. Further, a glass substrate is used as a member of the transparent substrate 11, SiO₂ is used as a member of the convexo-concave portion 12, and a resin is used as a member of the filling portion 13 respectively.

First, SiO₂ is film-formed with a thickness of 2.13 μm on a glass substrate. Then, SiO₂ is processed into a 2-stages convexo-concave structure by photolithography or the like to form on the transparent substrate 11, the convexo-concave portion 12. Then, the resin is applied on the convexo-concave structure so that the concave portions 122 of the convexo-concave portion 12 will be filled, and the top surfaces of the convex portions 121 will be covered.

Table 13 shows a specific structure of the convexo-concave portion 12 in Ex. 10.

TABLE 13

| Structure | Material | Height of each stage in convexo-concave portion [μm] | |
|---|---|---|---|
| | | First stage | Second stage |
| Filling portion | Resin | — | — |
| Convexo-concave portion | SiO₂ | 0 | 2.13 |
| Substrate | Glass | — | — |

Further, in the convexo-concave structure in Ex. 10, base units 31 having one stage of the convex portion (SiO₂ portion) and the concave portion (resin portion) arranged in horizontal and vertical directions at a predetermined pitch are two-dimensionally arranged, and 9 light spots in total are formed by the convexo-concave structure. As viewed from a planar direction perpendicular to an optical axis, the area of the resin side (side having a high refractive index) of the convexo-concave structure is 45% (A=0.45) in the base unit 31. The refractive index of the glass substrate in Ex. 10 is 1.515, and the refractive index of $SiO_2$ is 1.450. Further, the refractive index of the resin is shown in Table 14. In Ex. 10, the height of one stage of the convex portion is 2.13 μm. Each refractive index is a value to light having λ=950 nm.

TABLE 14

| Temperature (° C.) | $SiO_2$ | Resin | Δn | Δn variation |
|---|---|---|---|---|
| 0 | 1.4500 | 1.6939 | 0.2439 | 0.7% |
| 20 | 1.4500 | 1.6922 | 0.2422 | 0.0% |
| 50 | 1.4500 | 1.6896 | 0.2396 | −1.1% |

Figure 21:
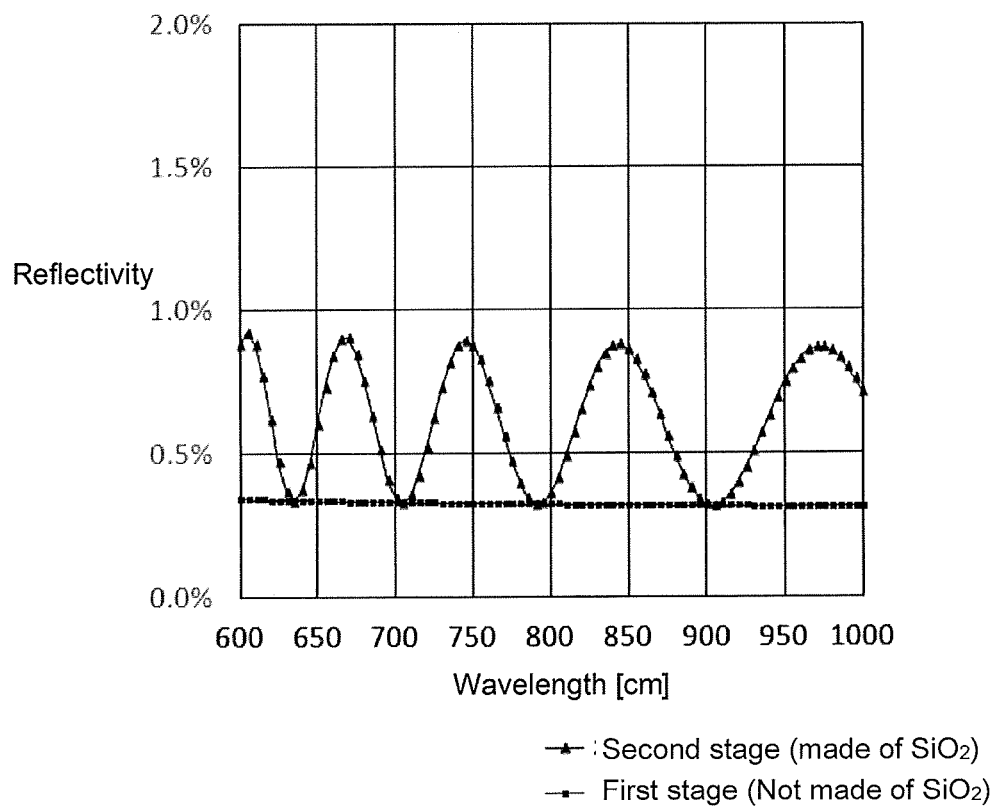
FIG. 21 shows results of calculation of the reflectivity at a wavelength of from 600 to 1,000 nm in Ex. 10.

FIG. 21 shows calculation results of the reflectivity at a wavelength of from 600 to 1,000 nm with respect to normal incidence of each optical path in Ex. 10. The reflectivity to light in each optical path is calculated by means of the equation (7). It is evident from FIG. 21 that the diffractive optical element in Ex. 10 has a maximum reflectivity to light in a waveband of 950 nm band (950 nm±20 nm) of 0.9%, and the average of the reflectivity to light in each optical path is 0.6%. Further, assuming that the total reflection of high order diffracted light and the absorption do not occur, the forward transmittance in Ex. 10 is 98.4%.

Further, by the calculation of the variation of zeroth order-diffraction efficiency at each temperature based on the zeroth order-diffraction efficiency at 20° C. being 1, the zeroth order diffraction efficiency is 1.06 at 50° C. and 0.96 at 0° C., and the variation is less than 10%.

Ex. 11

This example is also an example of the diffractive optical element 10 in Embodiment 1 illustrated in FIG. 1. In Ex. 11, the number of stages of the convexo-concave portion 12 is 2 stages. Further, a glass substrate is used as a member of the transparent substrate 11, $TiO_2$ is used as a member of the convexo-concave portion 12, and a silicone resin is used as a member of the filling portion 13 respectively.

First, $TiO_2$ is film-formed with a thickness of 689 nm on a glass substrate. Then, $TiO_2$ is processed into a one-stage convexo-concave structure by photolithography or the like to form on the transparent substrate 11, the convexo-concave portion 12. Then, a silicone resin is applied on the convexo-concave structure so that the concave portions 122 of the convexo-concave portion 12 will be filled, and the top surfaces of the convex portion 121 will be covered for planarization.

Table 15 shows a specific structure of the convexo-concave portion 12 in Ex. 11. The others are the same as in Ex. 10.

TABLE 15

| | | Height of each stage in convexo-concave portion [nm] | |
|---|---|---|---|
| Structure | Material | First stage | Second stage |
| Filling portion | Resin | — | — |
| Convexo-concave portion | $TiO_2$ | 0 | 689 |
| Substrate | Glass | — | — |

Further, in the convexo-concave structure in Ex. 11, base units 31 having one stage of the convex portion ($TiO_2$ portion) and the concave portion (resin portion) arranged in horizontal and vertical directions at a predetermined pitch are two-dimensionally arranged, and 9 light spots in total are formed by the convexo-concave structure. As viewed from a planar direction perpendicular to an optical axis, the area of the resin side (side having a high refractive index) of the convexo-concave structure is 45% (A=0.45) in the base unit 31.

The refractive index of the glass substrate in Ex. 11 is 1.515, and the refractive index of $TiO_2$ and the resin are show in Table 16. In Ex. 11, the height of one stage of the convex portion is 689 nm so that the optical path length will be an integral multiple of a half wavelength of the designed wavelength of 950 nm.

TABLE 16

| Temperature (° C.) | $TiO_2$ | Resin | Δn | Δn variation |
|---|---|---|---|---|
| 0 | 2.1433 | 1.4975 | 0.6458 | −0.3% |
| 20 | 2.1430 | 1.4950 | 0.6480 | 0.0% |
| 50 | 2.1425 | 1.4913 | 0.6512 | 0.5% |

Figure 22:
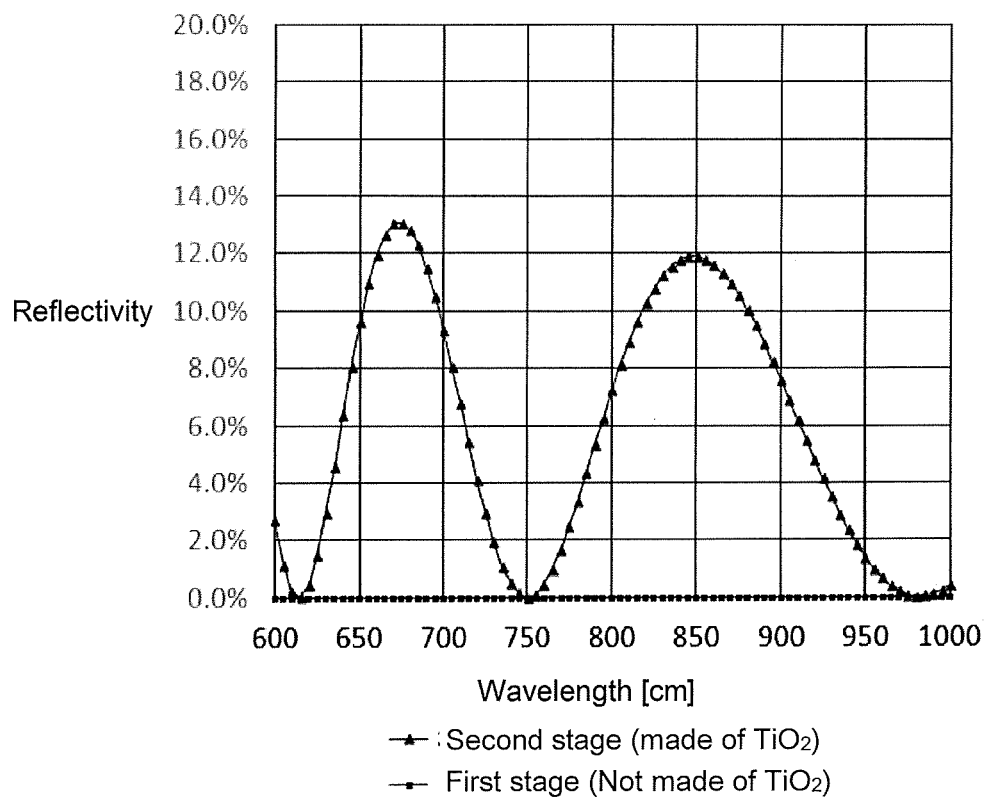
FIG. 22 shows results of calculation of the reflectivity at a wavelength of from 600 to 1,000 nm in Ex. 11.

In FIG. 22, calculation results of the reflectivity at a wavelength of from 600 to 1,000 nm with respect to normal incidence of each optical path in Ex. 11 are shown. The calculation is carried out by means of the equation (7). It is evident from FIG. 22 that the diffractive optical element in Ex. 11 has a maximum reflectivity of 3.5% to light having a wavelength band of 950 nm (950±20 nm), and the average value of the reflectivity to light in each optical path is 1.8%. Accordingly, the forward transmittance in Ex. 11 considering the reflection (reflection by the laminated structure of the transparent substrate, the convexo-concave portion and the filling portion) and the total reflection of high order diffracted light at the emergent side interface, is 84.6%.

The reflectivity to the optical path at the second stage ($TiO_2$ portion) of the convexo-concave portion is small at λ=950 nm, etc., since nd/λ is 0.47, and nd is a value close to an integral multiple of half wavelength.

Further, by the calculation of the variation of zeroth order diffraction efficiency at each temperature based on the zeroth order-diffraction efficiency at 20° C. being 1, the zeroth order diffraction efficiency is 0.95 at 50° C. and 1.03 at 95° C., and the variation is less than 10%.

Ex. 12

Figure 23:
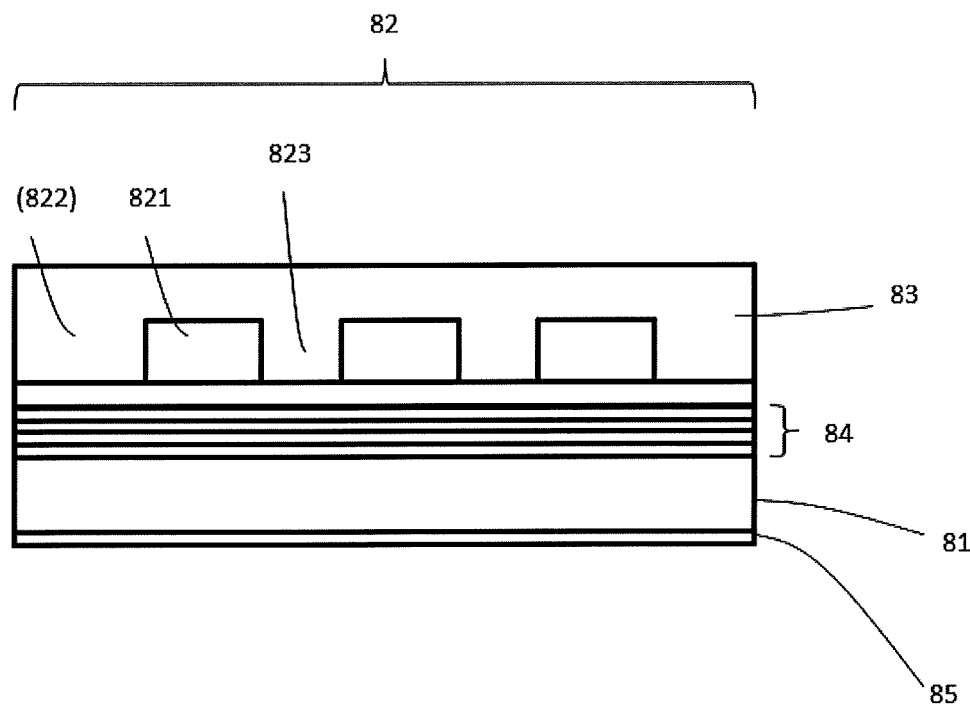
FIG. 23 is a view schematically illustrating the convexo-concave structure of the diffractive optical element in Ex. 12.

The convexo-concave structure in this Ex. is shown in FIG. 23. In Ex. 12, the number of stages of the convexo-concave portion 82 is 2 stages. Further, a glass substrate was used as a member of the transparent substrate 81, $Ta_2O_2$ was used as a member of the convexo-concave portion 82, and a methylsiloxane polymer was used as a member of the filling portion 83 respectively.

First, a refractive index-controlling layer 84 consisting of 4 layers was film-formed on a glass substrate, and $Ta_2O_2$ was film-formed with a thickness of 695 nm thereon. Then, Ta$_2$O$_2$ was processed into a one-stage convexo-concave structure by photolithography or the like to form the convexo-concave portion 82 having a depth of 595 nm. Then, a methylsiloxane polymer was applied on the convexo-concave structure and cured so that the concave portions 822 of the convexo-concave portion 82 would be filled, and the top surfaces of the convex portions 821 would be covered for planarization.

Figure 24:
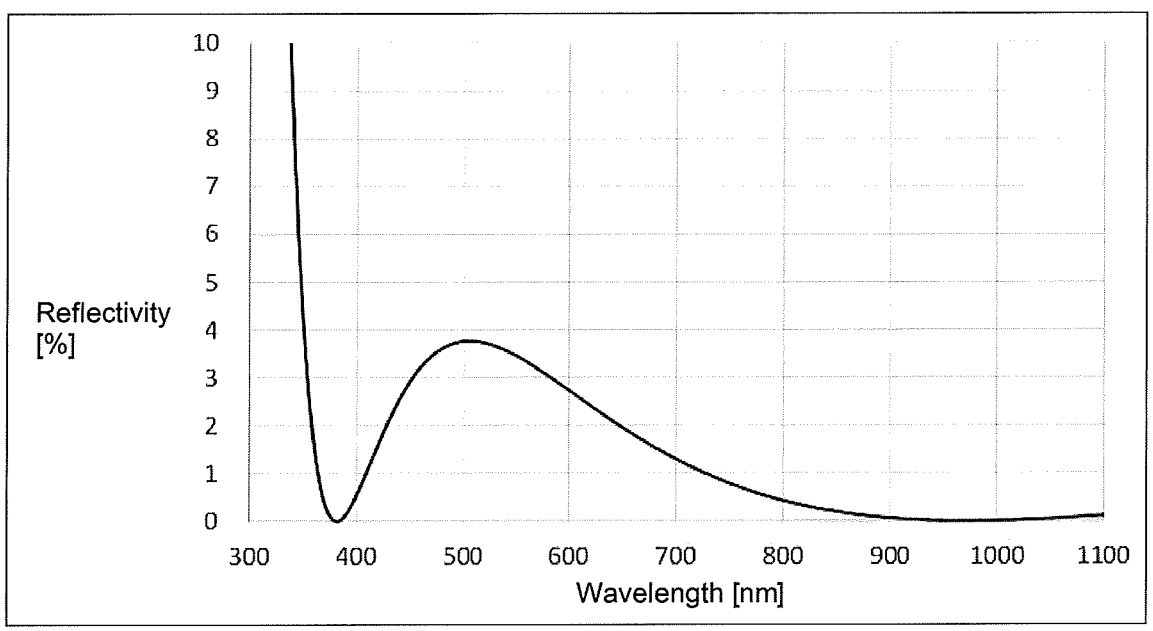
FIG. 24 shows results of calculation of the reflectivity at a wavelength of from 300 to 1,100 nm in Ex. 12.

FIG. 24 shows a specific structure of the refractive index-controlling layer 84 and calculated theoretical reflectivity in Ex. 12. As shown in FIG. 24, the theoretical reflectivity at a wavelength band of from 900 to 1100 nm is at most 4%.

Further, in the convexo-concave structure in Ex. 12, base units having one stage of the convex portion (Ta$_2$O$_2$ portion) and the concave portion (resin portion) arranged in horizontal and vertical directions at a pitch of 3 μm are two-dimensionally arranged, and 9 light spots in total are formed by the convexo-concave structure.

Figure 25:
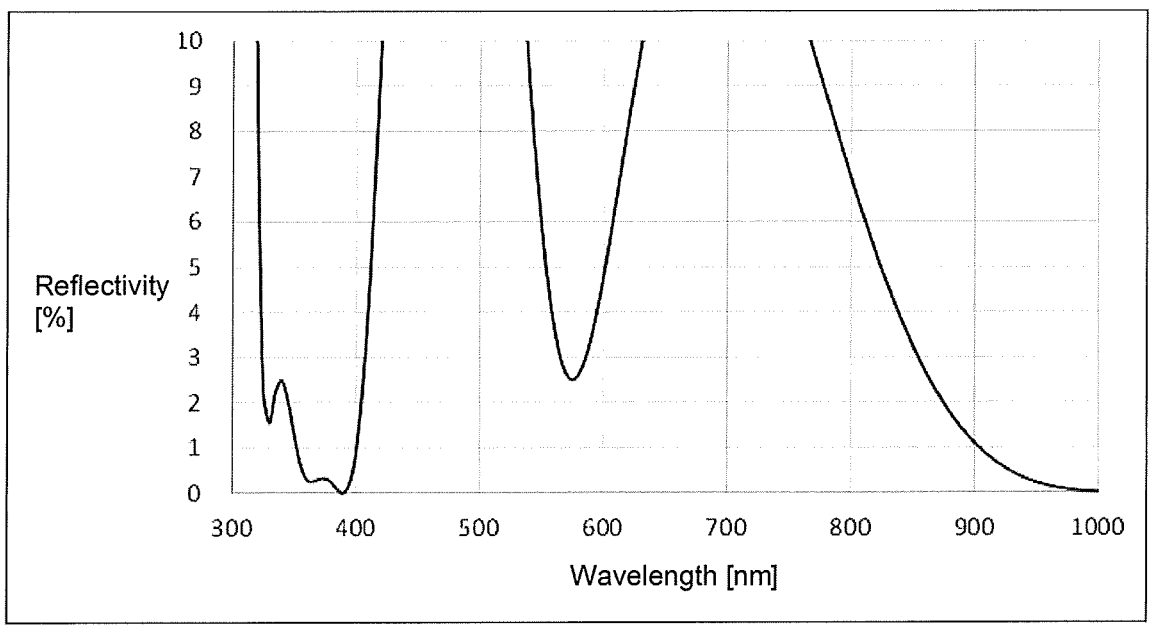
FIG. 25 shows results of calculation of the reflectivity at a wavelength of from 300 to 1,000 nm in Ex. 12.

The refractive index of the glass substrate in Ex. 12 is 1.515 and as the refractive index of each material with respect to light having a wavelength of 933 nm, SiO2 is 1.456, Ta$_2$O$_2$ is 2.196, and the methylsiloxane polymer is 1.386. Further, an antireflection layer 85 was formed on a plane facing the convexo-concave portion of the transparent substrate 81, and the structure and the theoretical reflectivity are shown in FIG. 25.

Table 17 shows results of the measurement of the diffraction efficiency at a wavelength of 933 nm in Ex. 12. At least 75% of the total diffraction efficiency was measured, and the temperature variation was also at most 1%.

TABLE 17

|  | 0 order diffracted light | Diffraction efficiency at 9 points in total |
| --- | --- | --- |
| 0° C. | 14.6% | 76.3% |
| 20° C. | 14.5% | 76.3% |
| 50° C. | 14.5% | 76.3% |

Ex. 13

Figure 26:
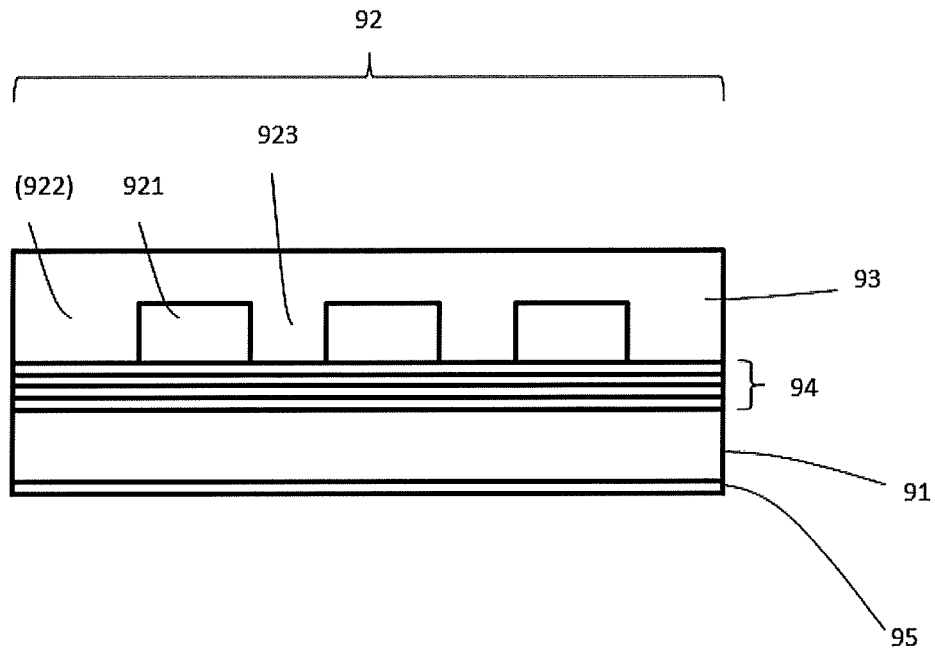
FIG. 26 is a view schematically illustrating the convexo-concave structure of the diffractive optical element in Ex. 13.

The convexo-concave structure in this Ex. is shown in FIG. 26. In Ex. 13, the number of stages of the convexo-concave portion 92 is 2 stages. Further, a glass substrate was used as a member of the transparent substrate 91, Ta$_2$O$_2$ was used as a member of the convexo-concave portion 92, and an epoxy resin was used as a member of the filling portion 93 respectively.

First, a refractive index-controlling layer 94 consisting of 4 layers was film-formed on the glass substrate, and Ta$_2$O$_2$ was film-formed with a thickness of 515 nm thereon. Then, Ta$_2$O$_2$ was processed into a one-stage convexo-concave structure by photolithography or the like to form the convexo-concave portion 92 having a depth of 515 nm. Then, an epoxy resin was applied on the convexo-concave structure and cured so that the concave portions 922 of the convexo-concave portion 92 would be filled, and the top surface of the convex portions 921 would be covered for planarization.

FIG. 24 shows a specific structure of the refractive index-controlling layer 94 in Ex. 13 and calculated theoretical reflectivity. As shown in FIG. 24, the theoretical reflectivity at a wavelength band of from 900 to 1100 nm is at most 4%.

Further, in the convexo-concave structure in Ex. 13, base units having one stage of the convex portion (Ta$_2$O$_2$ portion) and the concave portion (resin portion) arranged in horizontal and vertical directions at a pitch of 3 μm are two-dimensionally arranged, and 9 light spots in total are formed by the convexo-concave structure.

The refractive index of the glass substrate in Ex. 13 is 1.515, and as the refractive index of each material with respect to light having a wavelength of 933 nm, SiO$_2$ is 1.456, Ta$_2$O$_5$ is 2.196, and the epoxy resin is 1.500. Further, an antireflection layer 95 was formed on a surface facing to the convexo-concave portion of the transparent substrate 91, and FIG. 25 shows the structure and the theoretical reflectivity.

Table 18 shows results of the measurement of the diffraction efficiency at a wavelength of 933 nm in Ex. 13. At least 75% of the total diffraction efficiency was measured, and the temperature variation was at most 1%.

TABLE 18

|  | 0 order diffracted light | Diffraction efficiency at 9 points in total |
| --- | --- | --- |
| 0° C. | 27.3% | 78.0% |
| 20° C. | 27.2% | 78.0% |
| 50° C. | 27.1% | 78.1% |

Ex. 14

Figure 27:
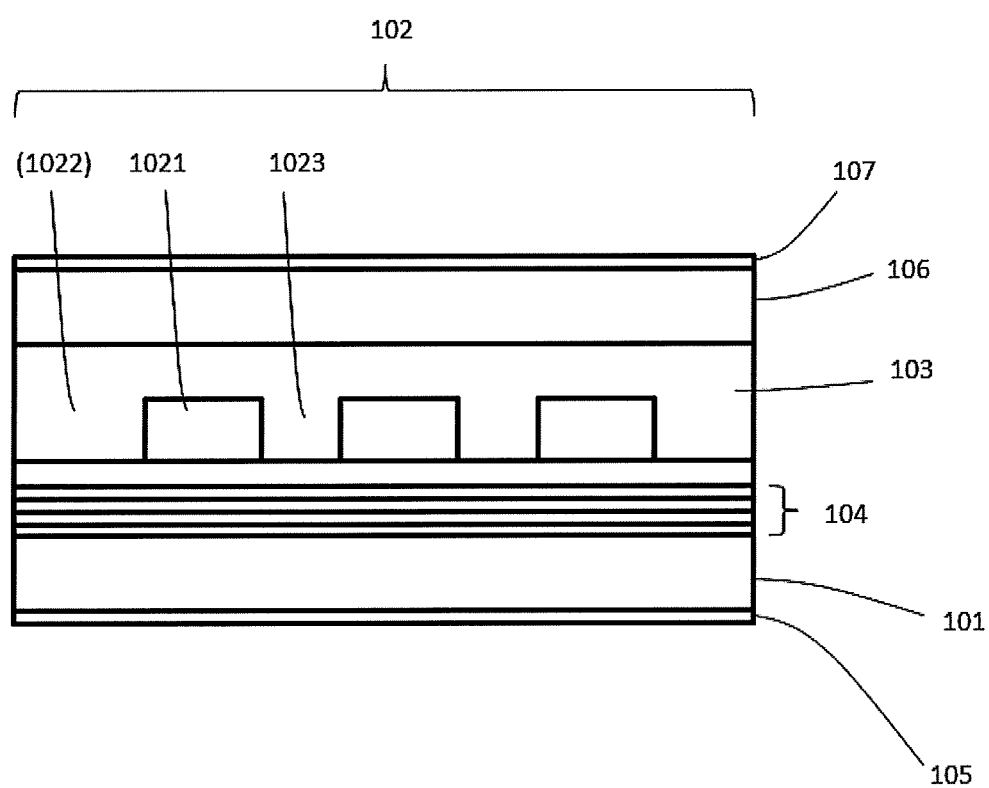
FIG. 27 is a view schematically illustrating the convexo-concave structure of the diffractive optical element in Ex. 14.

The convexo-concave structure in this Example is shown in FIG. 27. In Ex. 14, the number of the convexo-concave portion 102 is 2 stages. Further, a glass substrate was used as a member of the transparent substrate 101, Ta$_2$O$_5$ was used as a member of the convexo-concave portion 102, and a silicone resin was used as a member of the filling portion 103 respectively.

First, a refractive index-controlling layer 104 consisting of 4 layers was film-formed on a glass substrate, and Ta$_2$O$_5$ was film-formed with a thickness of 715 nm thereon. Then, Ta$_2$O$_5$ was processed into a one-stage convexo-concave structure by photolithography or the like to obtain a convexo-concave portion 102 having a depth of 615 nm. Then, the silicone resin was applied on the convexo-concave structure so that the concave portions 1022 of the convexo-concave portion 102 would be filled, and the top surface of the convex portions 1021 would be covered for planarization, and a second glass substrate 106 was laminated, followed by curing. The second glass substrate 106 has an antireflection layer 107 on its surface layer.

FIG. 24 shows a specific structure of the refractive index-controlling layer 104 in Ex. 14 and calculated theoretical reflectivity. As shown in FIG. 24, the theoretical reflectivity at a wavelength band of from 900 to 1,100 nm is at most 4%.

Further, in the convexo-concave structure in Ex. 14, base units having one stage of the convex portion (Ta$_2$O$_2$ portion) and the concave portion (resin portion) arranged in horizontal and vertical directions at a pitch of 3 μm are two-dimensionally arranged, and 9 light spots in total are formed by the convexo-concave structure.

The refractive index of the glass substrate in Ex. 14 is 1.515, and as the refractive index of each material with respect to light having a wavelength of 933 nm, SiO$_2$ is 1.456, Ta$_2$O$_2$ is 2.196, and the silicone resin is 1.502. Further, an antireflection layer 105 was formed on a plane facing the convexo-concave portion of the transparent substrate 101, and the structure and the theoretical reflectivity are shown in FIG. 25. The optical properties of the antireflection layer 107 are also shown in FIG. 25.

Table 19 shows results of the measurement of the diffraction efficiency at a wavelength of 933 nm in Ex. 14. At least 75% of the total diffraction efficiency was obtained, and the temperature variation was at most 1%.

TABLE 19

|  | 0 order diffracted light | Diffraction efficiency at 9 points in total |
|---|---|---|
| 0° C. | 15.5% | 81.4% |
| 20° C. | 15.2% | 81.1% |
| 50° C. | 14.4% | 81.0% |

INDUSTRIAL APPLICABILITY

An optical element or device which is suitably used in applications for efficiently diffusing light in a specific range while suppressing loss of light and in applications for applying light of a predetermined pattern while suppressing loss of light.

This application is a continuation of PCT Application No. PCT/JP2018/018973, filed on May 16, 2018, which is based upon and claims the benefit of priority from Japanese Patent Application No. 2017-104668 filed on May 26, 2017. The contents of those applications are incorporated herein by reference in their entireties.

REFERENCE SYMBOLS 10, 50, 60 and 70: diffractive optical element, 11, 51, 61 and 71: transparent substrate, 12, 52, 62 and 72: convexo-concave portion, 121, 521, 621 and 721: convex portion, 122, 522, 622 and 722: concave portion, 523 and 623: first layer, 724: base block, 13, 53, 63 and 73: filling portion, 64 and 65: refractive index-controlling layer, 21: incident light, 22: diffracted light rays, 23: light spot, 31: base unit, 11-1: first transparent substrate, 11-2: second transparent substrate, 12-1: first convexo-concave portion, 12-2: second convexo-concave portion

What is claimed is:

1. A diffractive optical element having a convexo-concave pattern to generate two-dimensional phase distribution, which two-dimensionally diffracts incident light into plural diffracted light rays,
   which comprises a transparent substrate, a convexo-concave portion formed so as to be in contact with one surface of the transparent substrate and a filling portion with which concave portions of the convexo-concave portion are filled and which covers top surfaces of convex portions of the convexo-concave portion for planarizing the convexo-concave portion,
   wherein the convexo-concave portion has at least two stages on the surface of the transparent substrate; the top surfaces of the respective stages are parallel to one another;
   among the transparent substrate, the convexo-concave portion and the filling portion, the refractive indexes of at least the convexo-concave portion and the filling portion are different with respect to the incident light which enters from the normal direction of the surface of the transparent substrate; and all values of n1, n2 and n3 are at most 2.2, wherein n1, n2 and n3 are refractive indexes of the transparent substrate, the convexo-concave portion and the filling portion respectively with respect to the incident light,
   wherein the diffractive optical element has a forward transmittance of at least 80% in at least an effective field of the incident light.

2. The diffractive optical element according to claim 1, wherein $|n2-n3|\geq 0.2$.

3. The diffractive optical element according to claim 1, wherein the angle toward the diagonal direction of light spots of plural outgoing diffracted light rays when the incident light enters from the normal direction, is at least 7.5°.

4. The diffractive optical element according to claim 1, wherein the number of formed light spots of plural outgoing diffracted light rays when the incident light enters from the normal direction, is at least 4.

5. The diffractive optical element according to claim 1, wherein $|n1-n3|\leq 0.3$.

6. The diffractive optical element according to claim 1, which satisfies $n3<n1<n2$ or $n2<n1<n3$.

7. The diffractive optical element according to claim 1, wherein a part of the filling portion is in contact with the transparent substrate in an effective field of the incident light, and
   in the effective field, A<50% wherein A is the proportion of the area of interfaces where the convexo-concave portion and the filling portion are in contact with the transparent substrate, to the area of interfaces where a member having a higher refractive index between the convexo-concave portion and the filling portion is in contact with the transparent substrate.

8. The diffractive optical element according to claim 1, wherein the convexo-concave portion has a first layer covering a surface of the transparent substrate in at least an effective field of the incident light, and the filling portion planarizes the convexo-concave portion without being in contact with the transparent substrate.

9. The diffractive optical element according to claim 1, wherein n2>n3, and all of n1, n2 and n3 are at most 1.96, or n2<n3, and all of n1, n2 and n3 are at most 2.1.

10. The diffractive optical element according to claim 1, wherein at any stage of the convexo-concave portion, the distance from the transparent substrate to the top surface of the stage corresponds to the optical path length of an integral multiple of half-wavelength of the predetermined designed wavelength among wavelengths included in all wavelength regions of the incident light.

11. The diffractive optical element according to claim 10, wherein the convexo-concave portion has at least 4 stages, and in at least half stages of the convexo-concave portion, the distance from the transparent substrate to the top surface of the stage corresponds to the optical path length of an integral multiple of half-wavelength of the predetermined designed wavelength among wavelengths included in all wavelength regions of the incident light.

12. A diffractive optical element having a convexo-concave pattern to generate two-dimensional phase distribution, which two-dimensionally diffracts incident light into plural diffracted light rays,
   which comprises a transparent substrate, a convexo-concave portion formed on one surface of the transparent substrate and a filling portion with which concave portions of the convexo-concave portion are filled and which covers top surfaces of convex portions of the convexo-concave portion for planarizing the convexo-concave portion, wherein the convexo-concave portion has at least two stages on the surface of the transparent substrate; the top surfaces of the respective stages are parallel to one another; among the transparent substrate, the convexo-concave portion and the filling portion, the refractive indexes of at least the convexo-concave portion and the filling portion are different with respect to the incident light which enters from the normal direction of the surface of the transparent substrate; the diffractive optical element has a refractive index-controlling layer between the convexo-concave portion and the filling portion or between the transparent substrate and the convexo-concave portion; and the refractive index-controlling layer is a monolayer refractive index-controlling layer which satisfies the following equation (A) with respect to both interfaces of the refractive index-controlling layer or a refractive index-controlling layer consisting of at least one layer which satisfies a theoretical reflectivity R<4% by a multilayer structure, wherein $n_m$ is a refractive index of a medium which forms an incident side interface, $n_o$ is a refractive index of a medium which forms an emergent side interface, $n_r$ is a refractive index of the refractive index-controlling layer or each layer, and $d_r$ is the thickness:

$$(n_0 \times n_m)^{0.5} - \alpha < n_r < (n_0 \times n_m)^{0.5} + \alpha, \text{ and}$$

$$(1-\beta) \times \lambda/4 < n_r \times d_r < (1+\beta) \times \lambda/4, \quad \text{equation (A)}$$

wherein $\alpha=0.25$, $\beta=0.6$.

13. The diffractive optical element according to claim 12, which has the refractive index-controlling layers between the convexo-concave portion and the filling portion and between the transparent substrate and the convexo-concave portion.

14. The diffractive optical element according to claim 12, wherein any value of the refractive indexes of the transparent substrate, the convexo-concave portion and the filling portion with respect to the incident light is at least 1.7.

15. A diffractive optical element having a convexo-concave pattern to generate two-dimensional phase distribution, which two-dimensionally diffracts incident light into plural diffracted light rays, which comprises a transparent substrate, a convexo-concave portion formed so as to be in contact with one surface of the transparent substrate and a filling portion with which concave portions of the convexo-concave portion are filled and which covers top surfaces of convex portions of the convexo-concave portion for planarizing the convexo-concave portion, wherein the convexo-concave portion has at least two stages on the surface of the transparent substrate; the top surfaces of the stages are parallel to one another; among the respective stages of the convexo-concave portion, at least a stage having height is constructed by stacking at least one base block, when the base block is a multilayer film consisting of at least 2 layers having a predetermined refractive index and thickness, wherein the base block satisfies a theoretical reflectivity R<4% in the multilayer structure.

16. The diffractive optical element according to claim 1, which has a reflectivity of at most 10% in at least an effective field of the incident light.

17. The diffractive optical element according to claim 1, wherein the incident light is light having a wavelength of from 780 to 1,020 nm.

18. A projection device which projects light from a light source on a predetermined projection plane, which comprises a light source and the diffractive optical element as defined in claim 1 as an optical element to enlarge an area irradiated with light emitted from the light source, wherein the proportion of the luminous energy of light projected on the predetermined projection plane is at least 50% to the luminous energy of light emitted from the light source.

19. A measuring device which comprises a projection part to emit inspection light and a detection part to detect scattered light formed by irradiating an object to be measured with the inspection light emitted from the projection part, wherein the projection part is the projection device as defined in claim 18.

* * * * *